(12) United States Patent
Huang et al.

(10) Patent No.: US 9,944,854 B2
(45) Date of Patent: Apr. 17, 2018

(54) METHODS AND COMPOSITIONS TO REDUCE SOIL WATER REPELLENCY

(71) Applicant: UNIVERSITY OF GEORGIA RESEARCH FOUNDATION, INC., Athens, GA (US)

(72) Inventors: Qingguo Huang, Fayetteville, GA (US); Robert N. Carrow, Griffin, GA (US); Paul L. Raymer, Milner, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 14/403,641

(22) PCT Filed: May 29, 2013

(86) PCT No.: PCT/US2013/043098
§ 371 (c)(1),
(2) Date: Nov. 25, 2014

(87) PCT Pub. No.: WO2013/181240
PCT Pub. Date: Dec. 5, 2013

(65) Prior Publication Data
US 2015/0166889 A1    Jun. 18, 2015

Related U.S. Application Data

(60) Provisional application No. 61/652,942, filed on May 30, 2012, provisional application No. 61/692,730, filed on Aug. 24, 2012.

(51) Int. Cl.
*A61K 38/44* (2006.01)
*C09K 17/32* (2006.01)
(Continued)

(52) U.S. Cl.
CPC .............. *C09K 17/32* (2013.01); *A01B 79/02* (2013.01); *C05F 11/02* (2013.01); *C05F 11/10* (2013.01)

(58) Field of Classification Search
None
See application file for complete search history.

(56) References Cited

U.S. PATENT DOCUMENTS

| 6,146,428 A | 11/2000 | Kalum et al. |
| 2003/0097681 A1* | 5/2003 | Iimura ................ C12N 9/0061 800/278 |

(Continued)

FOREIGN PATENT DOCUMENTS

| WO | 2002056683 A2 | 7/2002 |
| WO | 2010111309 A1 | 9/2010 |
| WO | WO 2010/111309 | * 9/2010 |

OTHER PUBLICATIONS

Cañas et al., Environ. Sci. Technol. 41: 2964-2971 (2007).*
(Continued)

*Primary Examiner* — Erin M. Bowers
(74) *Attorney, Agent, or Firm* — Thomas | Horstemeyer, LLP

(57) ABSTRACT

The present disclosure describes methods and compositions for reducing and/or preventing soil water repellency. Embodiments of methods of reducing soil water repellency (SWR) of the present disclosure include applying to an area of groundcover a composition including an effective amount of at least one isolated enzyme capable of degrading or altering organic matter associated with SWR, where the SWR of the area of groundcover is reduced after treatment with the enzyme composition.

19 Claims, 19 Drawing Sheets

(51) Int. Cl.
　　　C05F 11/02　　　(2006.01)
　　　C05F 11/10　　　(2006.01)
　　　A01B 79/02　　　(2006.01)

(56) References Cited

U.S. PATENT DOCUMENTS

2009/0311752 A1　12/2009　Bodie et al.
2010/0267554 A1　10/2010　Madsen et al.
2012/0079764 A1　4/2012　Huang et al.

OTHER PUBLICATIONS

Fitzgerald et al., J. Agric. Food Chem. 53: 1769-1775 (2005).*
Hallett et al., Biologia 61(Suppl. 19): S334-S338 (2006).*
Talebnia et al., Bioresource Technol. 101: 4744-4753 (2010).*
Stoilova et al., Adv. Biosci. Biotechnol. 1: 208-215 (2010).*
Andreatta et al., Proc. Nat'l. Acad. Sci. USA 68(2): 253-265 (1971).*
Arias, M.E., Arenas, M., Rodriguez, J., Soliveri, J., Ball, A.S., Hernandez, M., 2003. Kraft pulp biobleaching and mediated oxidation of a nonphenolic substrate by laccase from Streptomyces cyaneus CECT 3335. Appl. Environ. Microbial. 69, 1953-1958.
Atanassova, I. and S. Doerr. 201 0. Organic compounds of different extractability in total solvent extracts from soils of contrasting water repellency. Europ. J. of Soil Sci. 61: 298-313.
Bailey, T. G., N.J. Davidson, and D. C. Close. 2012. Understanding the regeneration niche: microsite attributes and recruitment of eucalypts in dry forests. Forest Ecol. And Management 269: 229-238.
Barton, L. and T. D. Colmer. 2011. Ameliorating water repellency under turfgrass of contrasting soil organic matter content: effect of wetting agent formulation and application frequency. Agric. Water Management 99: 1-7.
Blanco-Canqui, H., 2011. Does no-till farming induce water repellency to soils? Soil. Use. Manage. 27, 2-9. Dekker, L. W., K. Oostindie, and C. J. Ritsema. 2005. Exponential increase of publications related to soil water repellency. Aust. J. of Soil Res. 43: 403-441.
Dekker, L.W., Ritsema, C.J., 1994. How water moves in a water repellent sandy soil. 1. Potential and actual water repellency. Water Resour. Res. 30, 2507-2517.
Deurer, M., K. Muller, C. Van Den Dijssel, K. Mason, J. Carter and B. E. Clothier. 2011. Is soil water repellency a function of soil order and proneness to drought? A survey of soils under pasture in the North Island of New Zealand. European J. of Soil Science 62: 765-779.
Doerr, S. H. and 13 coauthors. 2005. Extraction of compounds with water repellency in sandy soils of different origin. Aust. J. of Soil Res. 43: 225-237.
Doerr, S. H., C. J. Ritsema, L W. Dekker, D. F. Scott, and D. Carter. 2007. Water repellency of soils: new insights and emerging research needs. HydrologicalProcesses 21: 2223-2228.
Doerr, S. H., R. A. Shakesby, and R. P. D. Walsh. 2000. Soil water repellency: its causes, characteristics and hyro-goemorphological significance. Earth-Sci. Reviews 51:33-65.
Doerr, S.H., 1998. On standardizing the 'Water Drop Penetration Time' and the 'Molarity of an Ethanol Droplet' techniques to classify soil hydrophobicity: A case study using medium textured soils. Earth Surf. Proc. Land. 23, 663-668.
Fidanza, M.A., Cisar, J.L., Kostka, S.J., Gregos, J.S., Schlossberg, M.J., Franklin, M., 2007. Preliminary investigation of soil chemical and physical properties associated with type-1 fairy ring symptoms in turfgrass. Hydrol. Process. 21, 2285-2290.
Franco, C. M. M., M. E. Tate, and J. M. Oades. 1995. Studies on non-wetting sands. I.The role of intrinsic particulate organic matter in the development of water-repellency in non-wetting sands. Aust. J. Soil Res. 33: 253-263.

Gartam, R. and N. Ashwath. 2012. Hydrophobicity of 43 potting media: Its implications for raising seedlings in revegetation programs. J. of Hydro I. 430-431: 111-117.
Horne, D. J. and J. C. Mcintosh. 2000. Hydrophobic compounds in sands in New Zealand—extraction, characterization and proposed mechanisms for repellency expression. J. of Hydrology 231-232: 35-46.
Zeng, Y.L., Yang, X.W., Yu, H.B., Zhang, X.Y., Ma, F.Y., 2011. Comparative studies on thermochemical characterization of corn stover pretreated by White-Rot and Brown-Rot Fungi. J. Agric. Food Chem. 59, 9965-9971.
Karnok, K. A., E. J. Rowland, and K. H. Tan. 1993. High pH treatments and the alleviation of soil hydrophobicity on golf greens. Agron. J. 85: 983-986.
Kumar, P., Barrett, D.M., Delwiche, M.J., Stroeve, P., 2009. Methods for pretreatment of lignocellulosic biomass for efficient hydrolysis and biofuel production. Ind. Eng. Chern. Res. 48, 3713-3729.
Letey, J. 1969. Measurement of contact angle, water drop penetration time, and critical surface tension. Proc. of the Symposium on Water-Repellent Soils, May 6-10, 1968. Univ. of California, Riverside, 43-47.
Litthauer, D., van Vuuren, M.J., van Tender, A., Wolfaardt, F.W., 2007. Purification and kinetics of a thermostable laccase from Pycnoporus sanguineus (SCC 1 08). Enzyme. Microb. Technol. 40, 563-568.
Liu, J. Wang, M., Tennis, B., Habteselassie, M., Liao, X., Huang, Q., 2012. Fungal pretreatment of switchgrass for improved saccharification and simultaneous enzyme production. Bioresource Technol. 135, 39-45.
Lu, J., Huang, Q., Mao, L., 2009. Removal of acetaminophen using enzyme-mediated oxidative coupling processes: I. Reaction rates and pathways. Environ. Sci. Technol.43, 7062-7067.
Watson, C. L. and J. Letey. 1970. Indices for characterizing soil water-repellency based upon contact angle-surface tension relationships. Proc. of the Soil Sci. Soc. of Amer. 34: 841-844.
Madsen, M. D. et al. 2012. Postfire Restoration of Soil Hydrology and Wildland Vegetation Using Surfactant Seed Coating Technology. Geophysical Res. Abstracts. 65(3), 253-259.
Moody, D. R., M. J. Schlossberg, D. D. Archbald, A. S. McNitt, and M.A. Fidanza. 2009 Soil water repellency development in amended sand rootzones. Crop Sci. 49: 1885-1892.
Moore, D., Kostka, S.J., Boerth, T.J., Franklin, M., Ritsema, C.J., Dekker, L.W., Oostindie, K., Stoof, C., Wesseling, J., 2010. The effect of soil surfactants on soil hydrological behavior, the plant growth environment, irrigation efficiency and water conservation. J. Hydrol. Hydromech. 58, 142-148.
Muller, K. and M. Deurer. 2011. Review of the remediation strategies for soil water repellency. Agric., Ecosystems and Environ. 144: 208-221.
Nadav, J. Tarchitzky, A. Lowengart-Aycicegi, andY. Chen. 2011. Soil surface water repellency induced by treated wastewater irrigation: physio-chemical characterization and quantification. Irrig. Sci. DOI 10.1 007/s00271-011-0291-331, 49-58.
Pierson, F. B., P. R. Robichaud, C. A. Moffet, K. E. Spaeth, C. J. Williams, S. P. Hardegree, and P. E. Clark. 2008. Soil water repellency and infiltration in coarsetextured soils of burned and unburned sagebrush ecosystems. Catena 74: 98-108.
Pinto, P.A., Dias, A.A., Fraga, 1., Marques, G., Rodrigues, M.A.M., Colac;o, J., Sampaio, A., Bezerra, R.M.F., 2012. Influence of ligninolytic enzymes on straw saccharification during fungal pretreatment. Bioresource Technol. 111, 261-267.
Rillig, M. C. 2005. A connection between fungal hydrophobins and soil water repellency? Pedobiologia 49: 395-399.
Rodriguez Couto, S., Sanroman, M., GObitz, G.M., 2005. Influence of redox mediators and metal ions on synthetic acid dye decolourization by crude laccase from Trametes hirsuta. Chemosphere. 58, 417-422.
Roper, M. M. 2004. The isolation and characterization of bacteria with the potential to degrade waxes that cause water repellency in sandy soils. Aust. J. of Soil Res. 42: 427-434.
Roper, M. M. 2005. Managing soils to enhance the potential for bioremediation of water repellency. Aust. J. of Soil Res. 43: 803-810.

(56) References Cited

OTHER PUBLICATIONS

Roper, M. M. 2006. Potential for remediation of water repellent soils by inoculation with wax-degrading bacteria in south-western Australia. Biologia, Bratislava 61/Suppl. 19:S358-S362. Section Botany.

Sidhu, S. S., Q. Huang, R. N. Carrow, and P. L. Raymer. 2012a. Use of fungal laccases to facilitate biodethatching: a new approach. HortTech 47, 1536-1542.

Sidhu, S. S., Q. Huang, R. N. Carrow, and P. L. Raymer. 2012b. Laccase mediated changes in physical, chemical, and structural properties of creeping bentgrass (*Agrostis stolonifera* L.) thatch layer. J. of Environmental Quality 64, 48-56.

Singh Arora, D., Kumar Sharma, R., 2010. Ligninolytic fungallaccases and their biotechnological applications. Appl. Biochem. Biotechnol. 160, 1760-1788.

Strong, P.J., Burgess, J.E., 2007. Bioremediation of a wine distillery wastewater using white rot fungi and the subsequent production of laccase. Water Sci. Technol. 56, 179-86.

Taniguchi, M., Takahashi, D., Watanabe, D., Sakai, K., Hoshino, K., Kouya, T., Tanaka, T., 2010. Evaluation of fungal pretreatments for enzymatic saccharification of rice straw. J. Chem. Eng. Jpn. 43, 401-405.

Turner, B.L., Hopkins, D.W., Haygarth, P.M., Ostle, N., 2002. Beta-Giucosidase activity in pasture soils. Appl. Soil. Ecol. 20, 157-162.

Wallis, M.G., Home, D.J., 1992. Soil water repellency. Advances in Soil Science 20, 91-140.

Rodriguez Couto, S., Toea Herrera, J.L., 2006. Industrial and biotechnological applications of laccases: A review. Biotechnol. Adv. 24, 500-513.

Karapinar et al., "Scouring of cotton with cellulases, pectinases and proteases", Fibres & Textiles in Eastern Europe, Jul./Oct. 2004, vol. 12, No. 3 (47), pp. 79-82.

\* cited by examiner

METHODS AND COMPOSITIONS TO REDUCE SOIL WATER REPELLENCY

CROSS-REFERENCE TO RELATED APPLICATION

This application is the 35 U.S.C. § 371 national stage application of PCT Application No. PCT/US2013/043098, filed May 29, 2013, the entirety of which is hereby incorporated by reference and which also claims priority to, and the benefit of, U.S. provisional applications entitled, "Enzyme Compositions and Applications to Reduce Soil Water Repellency" having Ser. No. 61/652,942, filed May 30, 2012 and "Methods and Compositions to Reduce Soil Water Repellency," having Ser. No. 61,692,730, filed Aug. 24, 2012, both of which are entirely incorporated by reference herein.

BACKGROUND

Soil water repellency (SWR) is a condition where soil does not spontaneously wet when a drop of water is applied to the surface; in other words, the soil is too hydrophobic (Müller and Deurer, 2011). Hydrophobic soils occur in many countries on various lands, such as agricultural, pasture, coastal dune sands, forest, shrub lands, parks, turfgrass soils, no-till agriculture, and soils irrigated with treated wastewater. A substantial interest in SWR soils has grown in recent times (Blanco-Canqui, 2011; Dekker et al., 2005).

SWR can cause undesirable consequences such as environmental deterioration and considerable losses in crop production. SWR becomes especially problematic on water relationships and can cause associated environmental issues, such as, but not limited to, reduction in soil water intake, uneven wetting patterns, reduced irrigation efficiency and effective precipitation, increased preferential flow that can have adverse effects on aquifer contamination, greater runoff and erosion, limited seed and vegetative establishment, and reduced plant growth and quality (Doerr et al., 2000; Müller and Deurer, 2011). On sandy turfgrass soils and grasslands, SWR is a reoccurring problem, where the normal situation is called "localized dry spot" (LDS). In LDS, SWR appears as irregular dry areas from a few centimeters to several meters diameter with the repellency usually extending from the surface to 5-10 cm depth. A second SWR situation on turfgrass sites that can appear on all soil types occurs within the dry area of basidiomycete induced "fairy-ring" (Barton and Colmer, 2011; Fidanza et al., 2007).

The primary cause of SWR is formation of a coating of hydrophobic, organic material on soil particles. This hydrophobic organic material can include surface waxes, fatty acids, and other organics such as lignin, a recalcitrant polymer of phenols. These materials come from plant leaves and other decomposing organic matter, plant root exudates, fungal hyphae/exudates, and volatized organic materials condensing on soil particles following forest or grassland fires (Atanassova, 2010). Sandy soils are especially susceptible to SWR due to lower particle surface area. Once sands become coated by organics and upon drying to a critical moisture level, they exhibit a hydrophobic nature and, thereafter, resist rewetting. The conventional remediation practice involves the use of wetting agents (surfactants); but, this indirect approach is costly and only renders short-term positive effectiveness, with repeated applications needed to maintain hydrophilic conditions (Müller and Deurer, 2011; Moore et al., 2010). For recreational turfgrass sites with SWR, wetting agents are applied as a routine practice in the absence of other effective remediation practices. Biological methods have been attempted, involving culturing microorganisms capable of degrading wax in soil, and have shown to be effective at the lab scale (Müller and Deurer, 2011). However, considerable limitations still exist in practical field application in terms of costs and maintenance of inoculation population levels (Roper, 2006).

SUMMARY

Briefly described, embodiments of the present disclosure provide for methods and compositions for reducing soil water repellency.

Embodiments of methods of reducing soil water repellency (SWR) of the present disclosure include applying to an area of groundcover a composition including an effective amount of at least one isolated enzyme capable of degrading or altering organic matter associated with SWR, where the SWR of the area of groundcover is reduced after treatment with the enzyme composition. In embodiments of the methods of reducing SWR, the enzyme(s) are chosen from the group including the following enzymes: laccase, pectinase, chitinase, protease, cellulase, lipase, β-glucosidase, α-amylase, and combinations of two or more of these enzymes.

Embodiments of the present disclosure also include compositions for reducing and/or preventing SWR, where the compositions include a formulation including at least one isolated enzyme capable of degrading or altering organic matter associated with SWR, where the formulation is adapted for application to groundcover. In embodiments, the enzyme(s) of the composition are selected from the group including the following enzymes: laccase, pectinase, chitinase, protease, cellulase, lipase, β-glucosidase, α-amylase, and a combination of two or more of these enzymes.

The present disclosure also includes compositions for reducing SWR that have a formulation including at least two isolated enzymes capable of degrading or altering organic matter associated with SWR, where the formulation is adapted for application to groundcover. In embodiments, at least two of the enzymes of the composition are selected from the group including the following enzymes: laccase, pectinase, chitinase, protease, cellulase, lipase, β-glucosidase, α-amylase, and a combination of two or more of these enzymes.

Other compositions, methods, features, and advantages will be, or become, apparent to one with skill in the art upon examination of the following drawings and detailed description. It is intended that all such additional compositions, systems, methods, features, and advantages be included within this description, be within the scope of the present disclosure, and be protected by the accompanying claims.

BRIEF DESCRIPTION OF THE DRAWINGS

The disclosure can be better understood with reference to the following drawings, which are described in the description and examples below. The components in the drawings are not necessarily to scale, emphasis instead being placed upon clearly illustrating the principles of the present disclosure.

DESCRIPTION

Figure 1:
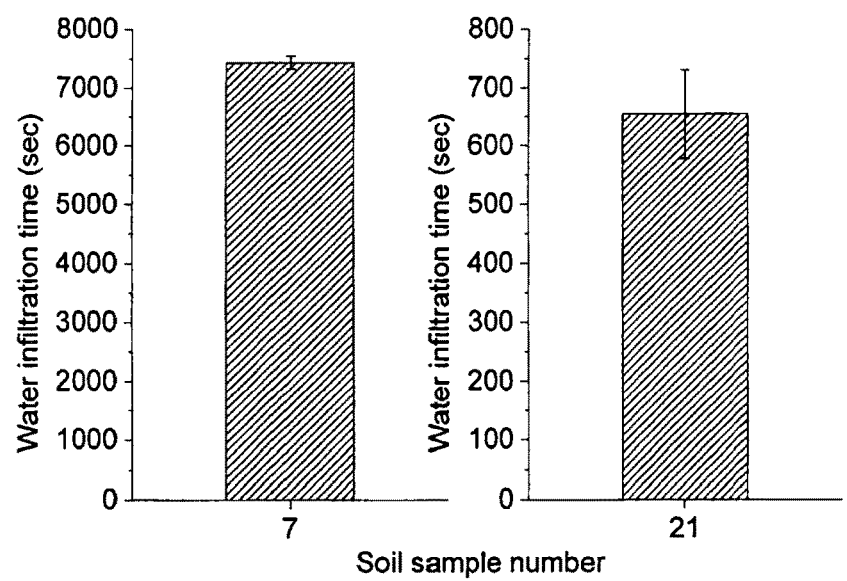
FIG. 1 is a bar graph illustrating water infiltration time (WDPT) of two untreated soil samples, where sample 7 is from a normal LDS area and sample 21 is from the dry area of a fairy ring.
Figure 2A:
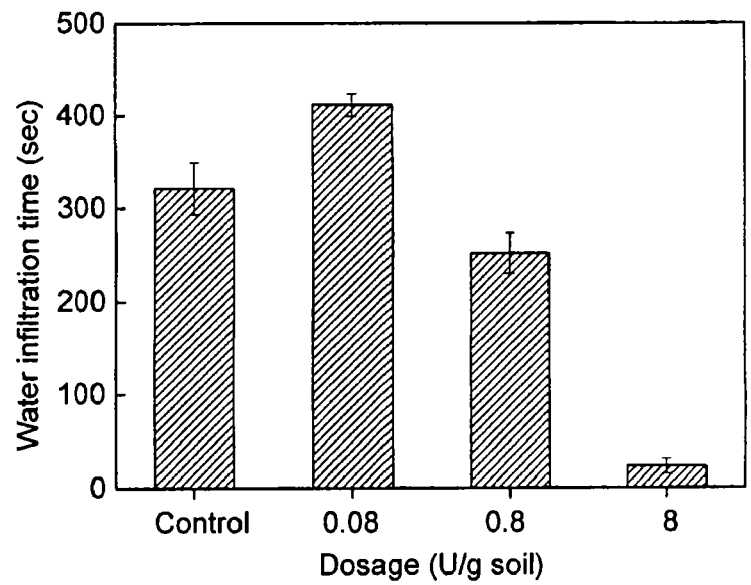
FIGS. 2A-2B are bar graphs illustrating WPDT of treated soil samples by laccase at various dosages. Sample No. 7-FIG. 2A; sample No. 21-FIG. 2B.
Figure 2B:
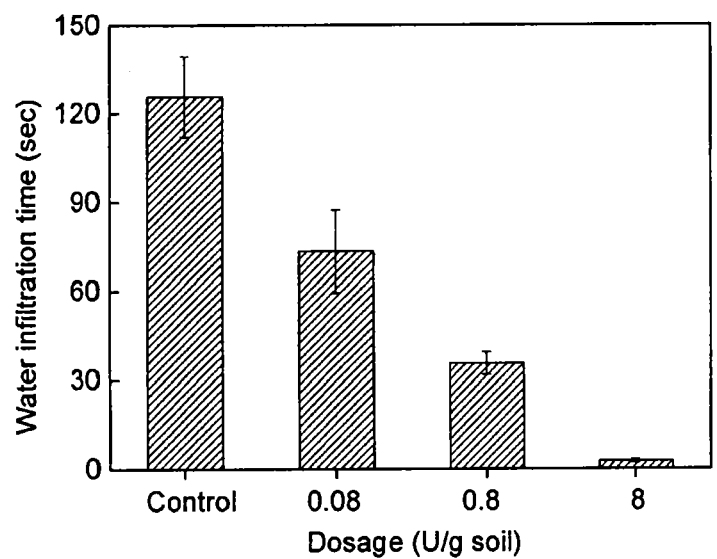

The details of some embodiments of the present disclosure are set forth in the description below. Other features, objects, and advantages of the present disclosure will be apparent to one of skill in the art upon examination of the following description, drawings, examples and claims. It is intended that all such additional systems, methods, features, and advantages be included within this description, be within the scope of the present disclosure, and be protected by the accompanying claims Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of molecular biology, microbiology, organic chemistry, biochemistry, genetics, botany, agriculture, and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a cell" includes a plurality of cells. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. Patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Prior to describing the various embodiments, the following definitions are provided and should be used unless otherwise indicated.

Definitions

In describing and claim1ng the disclosed subject matter, the following terminology will be used in accordance with the definitions set forth below.

As used herein the term "groundcover" refers to any material that covers a surface area of the land. Although "groundcover" can refer to a material, such as, but not limited to, vegetation (e.g., grass, creeping plants, etc.), that covers the soil (e.g., to protect it from erosion), in the present disclosure, groundcover includes vegetation, soil, sand and other natural materials that cover the earth as well as materials such as gravel. Thus, as used herein, "groundcover" includes, but is not limited to, soil, sand, silt, clay, turfgrasses and other plants and forms of vegetation used to cover and protect the soil, as well as composites of organic materials that form within or as part of such groundcovers, such as thatch and mat layers.

As used herein, the term "thatch" refers to a layer of organic matter including tightly intermingled dead and living plant matter (e.g., stolons, rhizomes, roots, crown tissue, leaf sheaths and blades) located generally between the soil surface and the green vegetation (e.g., green turfgrass). As used herein, "thatch" may also include the mat layer (e.g., a layer of thatch intermixed with sand and/or soil).

As used herein the term "soil" refers to material forming the surface of the earth and including a mixture of organic material and minerals. Soil includes materials such as mud, sand, silt, and clay and is also commonly referred to as "earth" or "dirt". Soil may itself form the surface of the earth in areas, and in other areas it may underlie other types of groundcover, such as grass and other plants and vegetation, gravel, pebbles, and the like.

As used herein the term "isolated enzyme" refers to an enzyme (e.g., laccase, pectinase, chitinase, protease, cellulase, lipase, α-amylase, etc.) that has been separated from its biological source (e.g., microbial organism, fungi, bacteria, etc.). The isolated enzyme may or may not be combined in a formulation with other ingredients for application to soil/groundcover. An isolated enzyme of the present disclosure may or may not be purified (e.g., free from other environmental contaminants, microbial secretes, or deactivated organisms), but it is separated from the source organisms, or the source organisms have been deactivated. Thus, for purposes of the present disclosure "isolate enzyme" includes not only purified enzymes, but also enzymes and mixtures of enzymes present in a fungal or microbial culture medium or extract.

The term "turf" or "turfgrass", as used herein, refers to any vegetative ground covering, such as, but not limited to, various species of grasses used for lawns, fields, golf course grounds, and the like.

As used herein, "alter", "degrade" or "degrading" with respect to organic material found in a soil sample, indicates that the enzymes are able to break-down portions of the organic components of the sample, alter the nature of organic matter, or otherwise act to alter or reduce the amount of organic matter content of the sample (measured by weight, thickness, degree of hydrophobicity (SWR), or other measureable variable) as compared to a sample not treated with the enzyme or as compared to the same sample prior to treatment with the enzyme. Furthermore, "prevention or remediation" of SWR, as used herein, indicates that application of an enzyme, composition, or formulation of the present disclosure to a groundcover alters, reduces or eliminates the amount of organic matter associated with the organic coatings or organic particulate matter contributing to SWR and thus causes the decrease in SWR over a predetermined period of time as compared to a similar groundcover that is not treated with the enzyme, composition, or formulation of the present disclosure.

As used herein, the terms "application" and/or "treatment" with respect to enzyme compositions of the present disclosure refers to the act of contacting a specimen/sample (e.g., soil/groundcover (e.g. in a sample, or in the "field")) with an enzyme composition of the present disclosure.

As used herein, the term "mediator" refers to compounds that help electron transfer during enzyme catalysis and thus enhance the efficiency of the enzyme. Examples of mediators include, but are not limited to, HBT (1-hydroxybenzotriazole), violuric acid (5-Isonitrosobarbituric acid), veratryl alcohol (3,4-dimethoxybenzyl alcohol), guaiacol (2-methoxyphenol), 4-methoxyphenol, catechol and the like.

As used herein, the term "rewetting agent" refers to surfactant compounds used to reduce the hydrophobicity of a material. Exemplary wetting agents include, but are not limited to, Aqueduct®, Lesco-Wet™, and the like.

The term "topdressing" as used herein, refers to a material applied to the top of a ground covering, usually in an effort to obtain a desirable effect on the groundcover, such as, but not limited to, improved growth, reduced erosion, improved color, improved water retention, improved health, or other quality. Some examples of topdressing include sand or other particulate material often applied to turfgrasses for various purposes, including, but not limited to, management of soil moisture content.

Description:

Embodiments of the present disclosure include methods and compositions including isolated enzymes capable of reducing soil water repellency (SWR). Methods and compositions of the present disclosure also include isolated enzymes capable of degrading organic matter in soil/groundcover to reduce SWR and and/or methods and compositions to prevent the accumulation of organic matter buildup responsible for increasing SWR.

SWR represents a significant problem in the maintenance and management of various groundcovers, including turfgrasses (such as golf course greens, sports fields, and lawns) as well as farmlands and other agricultural environments. Soil water repellency (SWR) occurs when a soil becomes too hydrophobic and does not spontaneously wet when a drop of water is applied to the surface. Doerr (1998) noted the two most common methods to assess soil hydrophobicity are: a) the Water Drop Penetration Time (WDPT); and b) the Molarity of an Ethanol Droplet (MED) test (Watson and Letey, 1969; Letey, 1970). The WDPT test is often used to assess SWR and involves placement of a droplet of water on an air- or oven-dried soil sample surface with the WDPT classes being: <5 s penetration time as very hydrophilic soil; 5-60 s hydrophilic; 60-180 s slightly hydrophobic; 180-600 s moderately hydrophobic; 600-3600 s strongly hydrophobic; 1-5 h very strongly hydrophobic; and >5 h as extremely hydrophobic (Doerr 1998).

Hydrophobic soils are found in many countries on agricultural, pasture, coastal dune sands, forest, shrub lands, parks, turfgrass soils, and soils irrigated with treated wastewater (Wallis and Home, 1992; Pierson et al., 2008; Deurer et al., 2011; Muller and Deurer, 2011; Nadav et al., 2011). Roper (2005) reported SWR occurring on more than 5 million hectares of western and southern Australia.

Patterns of SWR differ with the field situation. On sandy turfgrass soils and grasslands, SWR is a recurring problem, where the typical situation is called "localized dry spot" (LDS), and SWR appears as irregular dry areas from a few centimeters to several meters diameter with the repellency usually extending from the surface to 5-10 cm depth. A second SWR situation on turfgrass sites occurs within the dry area of basidiomycete induced "fairy-ring" on all soil types (Fidanza et al., 2007; Barton and Colmer, 2011). In forest lands, fire-induced SWR may occur on the surface or further down the profile as a hydrophobic zone, with both situations hindering seedling establishment (Bailey et al., 2012). Nadav et al. (2011) reported that SWR induced by organic matter in treated wastewater, caused SWR at the surface but also reduced the wetted zone under drip emitters causing greater preferential flow patterns. In recent years there has been a marked increase in attention to SWR in many countries around the world (Dekker et al. (2005)). Greater attention to SWR is due, in part, to increased awareness of its negative implications, especially on water relationships and associated environmental issues, such as: reduction in soil water intake; uneven wetting patterns; reduced irrigation efficiency and effective precipitation; increased preferential flow that can have adverse effects on aquifer contamination; greater runoff and erosion; limited seed and vegetative establishment; and reduced plant growth and quality (Doerr et al., 2000; Dekker et al., 2005; Doerr et al., 2007; Moore et al., 2010; Muller and Deurer, 2011; Nadav et al., 2011).

While SWR can occur in diverse climates and soils, it is quite prevalent on sandy soils which have low particle-surface area compared to soils higher in silt and clay content. Sandy soils are also more prone to surface drying. Soil water repellency on sandy soils is universally attributed to accumulation of hydrophobic organic matter (e.g., as a coating) on sand particle surfaces as well as hydrophobic organic particulate matter arising from plant debris or added to the soil. High organic matter in the thatch/mat layer of a groundcover may also contribute (Franco et al., 1995; Moody et al., 2009; Barton and Colmer, 2011; Muller and Deurer, 2011) to SWR. For fine-textured soils exhibiting SWR, organic coatings often occur on soil aggregate surfaces.

The organic matter contributing to hydrophobic organic coatings in SWR soils arises from sources such as, but not limited to: a) plant vegetation and root exudates with certain plant species especially prone to causing SWR, such as pine, gum, and oak trees and grasses; b) decomposition products from soil microbial activity, soil microorganism biomass such as fungal hyphae, and root exudates; c) applied organic amendments; d) ashed or volatized organic materials condensing on soil particles following forest or grassland fires; and e) organic matter in treated wastewater used for irrigation (Doerr et al., 2000; Rillig, 2005; Muller and Deurer, 2011; Nadav et al., 2011). Regardless of soil type or organic matter source, soil drying increases repellency with air-drying greatly enhancing SWR severity.

Many scientists have studied the chemical nature of many of these organic matter coatings, but there has been limited success in identification of specific compounds (Atanassova and Doerr, 2011) responsible for SWR. The typical types of organic compounds suggested to be involved with SWR include: a) high molecular weight, polar fatty acids and their esters (alkanes that are derived from plant and cuticular waxes); b) other alkanes (paraffin-like compounds), microbial derived waxes, alkanols, phytanols, phytanes; c) amphiphilic (partially hydrophobic) lipids, stigmasterols and plant derived sterols that have polar (hydrophilic) and non-polar (hydrophobic) groups; d) other polar molecules such as sugars, gylocsides, aromatic acids, and low molecular weight organic acids; e) humic and fulvic acids from soil microbial activity or possibly added as amendments; and f) hydrophobins, cysteine rich proteins expressed only by filamentous fungi (Doerr et al., 2005; Rillig, 2005; Atanassova and Doerr, 2010). This difficulty in determining the nature of specific organic coatings may be due to many attributes. The thinness of coatings and extremely small size of globules of organic matter on sand surfaces are difficult to see even in Scanning Electron Microscopy and difficult to selectively extract by chemical means. Changes occur in the orientation and hydrophobic-hydrophilic nature of compounds during drying and wetting making identification challenging. Also, the complexity and diversity of various soil organic matter compounds present extraction challenges (Doerr et al., 2000; Horne and McIntosh, 2000; Atanassova and Doerr, 2010).

Muller and Deurer (2011) reviewed twelve remediation strategies for SWR and noted that even with the major increase in SWR research over the past decade, current remediation strategies are limited in effectiveness. Most research efforts have been on indirect remediation strategies to manage the SWR symptoms rather than addressing the underlying causal factors. Of indirect methods, the use of wetting agents has received the most attention and success where the wetting agent/surfactant alters the hydrophobic nature of the organic matter contributing to SWR as well as reducing soil moisture surface tension to foster wettability. However, wetting agents are costly and applications must be repeated for continued effectiveness. In a review of surfactants on soil water relationships, Moore et al. (2010) also noted the often positive but short-term effectiveness of wetting agents. Particularly in dry climates or during drought conditions, water repellency often recurs in areas, in spite of treatment with wetting agents.

Direct SWR remediation strategies include attempts to remove the hydrophobic coating on sands by chemical means or bioremediation with wax-degrading bacteria.

Chemical removal of organic coatings using NaOH, which can dissolve humic acids and fluvic acids, was demonstrated by Karnok et al. (1993) in turfgrass systems, but potential for phytotoxicity and the difficulties of short term soil pH adjustments limit practical use of this means. Recently, some wetting agent marketers have promoted polyoxyalkylene polymers (a class of surfactants) with an undisclosed "organic solvent" (OARS™, http://www.aquaaid.com/pdfs/Literature/OARSlit.pdf) or "hydrophobic coating remover" (Symphony®, http://harrells.com/wp-content/harrells-products/label-images/SYMPHO.pdf) with claims of over 27% water-repellent humic substances removed from sand surfaces. However, these claims have not been proven by experimental evidence.

Biological remediation has been attempted using wax-degrading actinomycete bacteria with limited success in reducing SWR in controlled laboratory studies (Roper, 2004, 2005; Muller and Deurer, 2011). Degradation of waxes by wax-degrading bacteria was related primarily to their ability to produce biosurfactants. In field evaluations, inoculation alone even at heavy rates resulted in small but statistically significant, improvements in wettability, but the costs of production and application of the inoculant appear to outweigh the benefits (Roper, 2006). Inoculation followed by management to favor natural wax-degrading bacteria was found to be more practical and economical than inoculation alone (Roper, 2005, 2006). Compost addition, fertilizers, and especially lime, in conjunction with spring rains were necessary to promote populations of *Rhodococcus* sp. or *Mycobacterium* sp. However, remediation programs using a whole-organism approach suffer from the challenge of maintaining the viability of the organisms both before and after application in order to maintain efficacy. This can be challenging in many environments due to fluctuations in conditions that effect microbial viability (e.g., temperature, moisture, nutrient content, and the use of various chemicals (e.g., herbicides, etc.) on various groundcovers).

The present application provides methods that include direct application of isolated enzymes, or combinations of enzymes, that are capable of degrading certain organic fractions believed to contribute to SWR (e.g., the organic compounds that are adhered to the sand particles and present in the particulate organic matter and contribute to the hydrophobicity of the soil/groundcover). The enzymes used in embodiments of the present disclosure are found in natural systems, and enzyme activity is much less affected by changes in field environmental conditions (such as temperature, moisture and aeration) than are specific microbial populations.

In embodiments of the present disclosure, compositions for treating SWR include isolated enzymes capable of degrading of at least some organic matter associated with SWR. In embodiments of the present disclosure, isolated enzymes may be extracted directly from microbial sources, and some may be available commercially. In some embodiments, the isolated enzymes are obtained from the byproducts of biomass pretreatment (e.g., in biofuel production processes). Byproducts of biomass pretreatment include microbial extracts or microbial medium produced by microbes used in the biomass pretreatment process. Various microbes (e.g., fungi, bacteria) are used in such processes that produce enzymes useful for treatment of SWR. The extracts or other byproducts of the microbial cultures include isolated microbial enzymes (e.g., free from the living organism), and such extracts include microbial enzymes useful for treatment of SWR.

For instance, production of biofuel from lignocellulosic biomasses has gained increasing attention worldwide with pretreatment of the biomass by enzymatic hydrolysis used to enhance efficiency of production (Kumar et al., 2009). Of various pretreatment approaches, fungal pretreatment is receiving attention because it is environmental friendly and cost-effective. Recent research on various biomass sources have focused on fungal pretreatment using different fungi (e.g., corn stover (*Zea mays* L.) by white-rot fungus *Irpex lacteus* CD2 and brown-rot fungus *Fomitopsis* sp. IMER2 (Zeng et al., 2011); rice straw (*Oryza* spp.) by 15 strains of basidiomycetes with the most suitable white-rot fungus shown to be *Pleurotus ostreatus* (Taniguchi et al., 2010); wheat straw (*Triticum* spp) by 8 strains of *Trametes versicolor* (Pinto et al., 2012); and switchgrass (*Panicum virgatum*) (Liu et al., 2012)). Each of these fungal pretreatments was effective for enhancing enzymatic hydrolysis due to their powerful lignin-decomposing ability from extracellular ligninolytic enzymes: lignin peroxidase (LiP), manganese peroxidase (MnP) and laccase (Pinto et al., 2012). Enzymatic activity on the lignin in the biomass results in partial degradation with simultaneous alteration of chemical structure, and improved digestibility. Although most of published papers have found extracellular ligninolytic activity, few studies examined extraction and use of these enzymes as co-products to off-setting biomass pretreatment costs.

During a study of fungal pretreatment of switchgrass, involving solid state fermentation by a laccase-producing fungus, a main co-product was obtained, which was highly active in terms of laccase and β-glucosidase (Liu et al., 2012). For most fungal pretreatment (especially using laccase-producing fungi), the main co-product is enzymatic extract. This co-product can have value if suitable application can be found. Laccase (including crude laccase) in recent years has demonstrated beneficial utilization in a number of areas, such as decolorization (Rodríguez Couto et al., 2005), pulping and bleaching (Arias et al., 2003), bioremediation (Strong and Burgess, 2007), pollutants removal (Lu et al., 2009), et al (Rodríguez Couto and Toca Herrera, 2006). Direct production of this enzyme would be a high-cost process for most applications. Therefore, it is of great interest to combine fungal pretreatment of biomass for biofuel production with a useful and viable co-product, such as enzyme-rich extracts for use in applications such as the methods and compositions of the present disclosure for reduction of SWR.

Any enzyme capable of degrading organic matter that is associated with SWR can be used in the methods and compositions of the present disclosure. Such enzymes can come from various sources, such as fungi, bacteria and other microbes. Some exemplary enzymes useful in the methods and compositions of the present disclosure include, but are not limited to, laccase, pectinase, chitinase, protease, cellulase, lipase, β-glucosidase, α-amylase, and a combination of two or more of these enzymes. In some embodiments, the enzymes used in the compositions of the present disclosure include one or more, two or more, or a combination of all three of chitinase, laccase, and pectinase. When the isolated enzymes are in a microbial extract, more than one isolated enzyme is often present in the extract, as well as other compounds that may aid in the degradation of organic matter. Thus, compositions of the present disclosure may include a formulation including two or more of the isolated enzymes capable of degrading organic matter associated with SWR.

The compositions and formulations of the present disclosure including the isolated enzymes of the present disclosure are adapted to application to various groundcovers (e.g., bare soil, sand, turfgrasses, and other vegetative groundcovers, etc.) as appropriate (e.g., liquid or dry formulations). As discussed above, application may be tailored for the particular groundcover or environment, such as mixing with irrigation water, as a particulate topcoating, or a powdered seed coat, etc.

In embodiments, the compositions of the present disclosure may include other additives, such as a wetting agent or a mediator to increase the efficacy of the chemical reactions induced by the enzymes. When combined with the isolated enzymes of the present disclosure, wetting agents may be used in much smaller (and, thus, more cost effective) amounts than currently employed for treatment of SWR since the primary role of the wetting agent would be to reduce soil water tension to allow enhanced initial distribution on the enzyme upon application The methods of the present disclosure include applying the compositions of the present disclosure to an area of groundcover that has an undesirable level of SWR. In embodiments, the compositions of the present disclosure may be applied to an area of groundcover in a susceptible area, where prevention of SWR is desirable. Embodiments of the present disclosure also include periodic applications of the compositions of the present disclosure to achieve maintenance of certain groundcovers. In methods of the present disclosure for reducing SWR, an effective amount of the isolated enzyme is applied to an area of groundcover, where the effective amount will depend, at least in part, on the condition of the groundcover receiving treatment. The concentration of enzyme as well as the mode and timing of application will vary depending on whether acute treatment, maintenance treatment, or preventative treatment is desired.

In embodiments of methods of the present disclosure, treatment could be used on localized SWR areas as a corrective and/or preventative measure rather than a general broadcast approach which would require higher application rates. Application methods and formulations can be altered for the particular situation. For example, the isolated enzymes can be made into various formulations useful for the methods of reducing SWR of the present disclosure. For instance, the isolated enzymes may be mixed with a carrier liquid (e.g., water, including irrigation water or treated wastewater used for irrigation of groundcovers) and applied in liquid form. In other embodiments, the isolated enzymes of the present disclosure may be a dry formulation such as, but not limited to: powder that may be incorporated into seed coatings for establishment on SWR areas similar to using a wetting agent as a component of seed coatings (Madsen et al., 2010; 2012). Other embodiments of the present disclosure include a granular formulation with the isolated enzymes stabilized onto a particulate material such as, but not limited to, sand, calcined clay, or zeolite media, to provide a granular application option.

For particulate applications with the enzymes adhered to or otherwise in combination with a particulate material, in embodiments the enzymes are immobilized to the particles of a particulate material. In embodiments, immobilization on sand (or other inorganic particulate carrier) can be done by different approaches. For example, the sand or other particle can be treated with chitosan and/or gluteraldehyde to develop charges on the surface of sand particles, followed by enzyme loading and activity assessment. In some embodiments, formulations of the enzyme(s) can be encapsulated in a biodegradable material that can release the enzyme after application to the groundcover. Stabilized enzymes may prolong activity and allow reduced rates of application of enzyme. In embodiments, liquid, granular or powder formulations could also include a wetting agent to facilitate initial enzyme dispersion.

Various field application situations illustrate possible embodiments of methods of use for the compositions of the present disclosure. Some exemplary embodiments include, but are not limited to, the following. For normal SWR or LDS on sandy soil turfgrass sites, application could be by liquid or granular formulations directly on a specific SWR affected area or as a broad application over a certain area that has a history of SWR (but may or may not currently have an issue with SWR). Compositions of the present disclosure can be applied within the dry area of basidiomycete induced "fairy-ring" on all soil types in turfgrass systems as either granular or liquid formulations. Powdered forms can be used as a seed coating for seeds included in re-establishment of groundcover in SWR areas such as after fire-induced SWR in forest or shrub lands. Enzymes of the present disclosure can be applied as a liquid formulation via the irrigation lines of drip irrigation systems, such as when using treated wastewater that induces SWR in the area of influence drip emitters. In other embodiments, the enzymes of the present disclosure may be in granular formulation for direct application in seedling root zones or in seedling potting mixes, such as where the seedlings are for re-establishment within fire-induced SWR sites. Gautam and Ashwath (2012) recently noted that SWR in potted media of seedings used in revegetation programs inhibited establishment success. They determined wax-degrading bacteria levels and concluded that hydrophobic media appears to inhibit bacterial activity.

The Examples below describe some embodiments of the present disclosure using field samples from SWR areas to initiate evaluation of individual enzyme effectiveness over a broad range of enzyme activity concentrations to identify enzyme candidates and determine the rate of effective application. In example 2, crude fungal extracts from biomass pretreatment samples were used for treatment of SWR soils.

Environmental benefits of effective treatment of SWR in all situations would be expected by alleviation of water related issues such as: the reduction in soil water intake, uneven wetting patterns, reduced irrigation efficiency and effective precipitation intake, increased preferential flow that can have adverse effects on aquifer contamination, greater runoff and erosion; limited seed and vegetative establishment, and reduced plant growth and quality. For turfgrass areas, emphasis on enhanced water use-efficiency/conservation (i.e., reduced irrigation) is expected to result in more SWR situations in the future. Correction of SWR expressed as normal LDS on sand soils or fairy rings on more diverse soil types is essential for efficient irrigation and for vigor and quality of golf course turfgrass areas—greens, tees, fairways, and roughs—and sand based sports fields. Currently, the most effective strategies are to maintain high soil moisture and/or use wetting agents on an ongoing basis which is costly and not always successful. The methods and compositions of the present disclosure offer a less costly and direct treatment to degrade the organic coatings and provide a longer term solution to this problem.

Success in fairy ring SWR areas will also enhance fungicide effectiveness, reduce fungicide use over time, and increase turf quality. Thus, enzyme treatment effective in reducing SWR in fairy rings would become a component of efficient management of fairy ring or any other plant disease associated with SWR sites, such as spring dead spot on Bermuda grasses. In grasslands/pastoral areas, effective reduction of SWR could increase yield of forage and stocking rate. Reclamation of burned forest and shrub-land areas is often hindered by fire-induced SWR. Thus, the methods and compositions of the present disclosure offer a myriad of benefits for reduction of both environmental and monetary losses caused by SWR.

Now having described the embodiments of the present disclosure, in general, the Examples, below, describe some additional embodiments of the present disclosure. While embodiments of the present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

EXAMPLES

Example 1

A Novel Enzyme-Mediated Method to Resolve Water Repellency of Soils from Golf Course Areas
Introduction The present example presents methods involving enzymes as biological catalysts to resolve soil water repellency. It is believed to be the first research using enzymes as a biological treatment to address this issue. This laboratory study under conditions that favor enzyme activity entails: a) investigation of several enzymes that target different organic components; b) a wide range of enzyme activity to provide insight into the effective rate; c) determination of residual enzyme activity/recovery; and d) investigation of combinations of the most effective enzymes.

Materials and Methods
Soils:

Two different soil samples used in this Example are listed in Table 1.

TABLE 1

Description and sources of soil samples used in this study.

| ID Number | Description | Depth (inches) | Location | Comments |
|---|---|---|---|---|
| 7 | Rough #10, site D | 0-1.5 | Old Collier GC, Naples, FL | Sand area, normal LDS |
| 21 | Practice green | 0-1.5 | Southern Hills Golf and CC, Hawkinsville, GA | Sand, fairy ring area, LDS |

Enzymes:

All enzymes used in this study were purchased from Sigma except for laccase. The characteristics of each enzyme and activity determination conditions are listed in Table 2, below.

TABLE 2

Description and sources of enzymes evaluated in this example.

| | | | Activity determination conditions | | | |
|---|---|---|---|---|---|---|
| Enzyme | Sources | Microorganism | pH | Temperature | Substrate | Detection method |
| Laccase | Collaborator | *Pycnoporus* sp. SYBC-L3 | 3.5 | 25° C. | DMP | Spectrophotometer |
| Pectinase | Sigma | *Aspergillus niger* | 6.0 | 25° C. | Polygalacturonic acid | Spectrophotometer |
| Cellulase | Sigma | *Trichoderma viride* | 4.8 | 25° C. | NO1. Filter paper | HPLC |
| Xylanase | Sigma | *Thermomyces lanuginosus* | 4.8 | 25° C. | Xylan | HPLC |

Treatment of Soils:

The sampled soils were first air dried and then passed through a 2 mm sieve. Then 10 grams of soil were put into a crucible with subsequent addition of 15 mL enzyme solution or deionized water, (control). The crucible was covered with parafilm after homogeneous agitation and incubated under static conditions at room temperature for 3 days with periodic agitation. The treated soil samples were separated by filtration using a vacuum pump and oven dried at 40° C. for 36 h. Dried soils were used for subsequent water repellency analysis. The filtrate from the above procedure was used for determining residual enzyme activity. All treatments were replicated at least three times.

Analysis of Water Repellency:

The water repellency was analyzed using the water drop infiltration time (WDPT) method. Three separate water drops (0.05 mL for each) were gently uploaded onto a different surface location of the soil in each crucible. Infiltration time was exactly recorded by a timer as the time required for a water drop to fully disappear. The WDPT test is often used to assess SWR and involves placement of a droplet of water on an air- or oven-dried soil sample surface with the WDPT classes being: <5 s penetration time as very hydrophilic soil; 5-60 s hydrophilic; 60-180 s slightly hydrophobic; 180-600 s moderately hydrophobic; 600-3600 s strongly hydrophobic; 1-5 h very strongly hydrophobic; and >5 h as extremely hydrophobic (Doerr 1998).

Activity of Recovered Enzyme in Liquid Filtrate.

Enzyme activity (%) of the recovered liquid filtrate was calculated by dividing total activity remaining in the liquid filtrate by total activity added into each crucible.

Results

Untreated soils were highly water repellent and their water infiltration times for selected samples were shown in FIG. 1. A wettable soil has an infiltration rate by the WDPT method of <5 seconds. It took rather long periods for a water drop to infiltrate into soil for the two samples from different sources. A water infiltration time of over 2 hours was found for No. 7 from Fla., indicating extreme water repellency. As for the No. 21 sample from Ga., approximately 11 minutes of water infiltration time was observed, showing severe water repellency. Water infiltration time for No. 7 was almost 11 times higher than that of No. 21, which might be due to variables in soil particle size, organic matter type and amount. Particle size of the soil sample from Fla. was smaller than that of the soil sample from Ga., indicating a larger specific surface area and more opportunity for macromolecule organic matter to deposition on the surface. Soil of No. 21 was sampled from a typical fairy ring area, which was probably induced by fungi whose residues may affect water repellency.

Figure 3A:
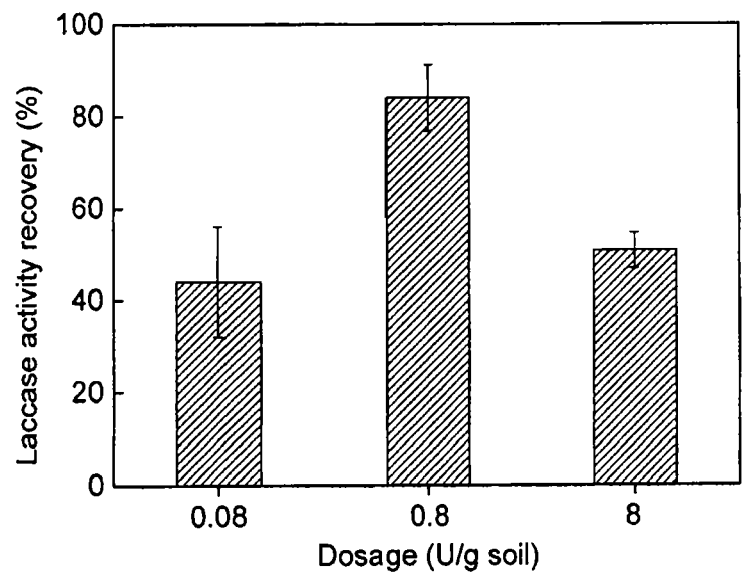
FIGS. 3A-3B are bar graphs illustrating laccase activity in recovered liquid filtrate after treatment of soil samples at various dosages. Sample No. 7-FIG. 3A; sample No. 21-FIG. 3B.
Figure 3B:
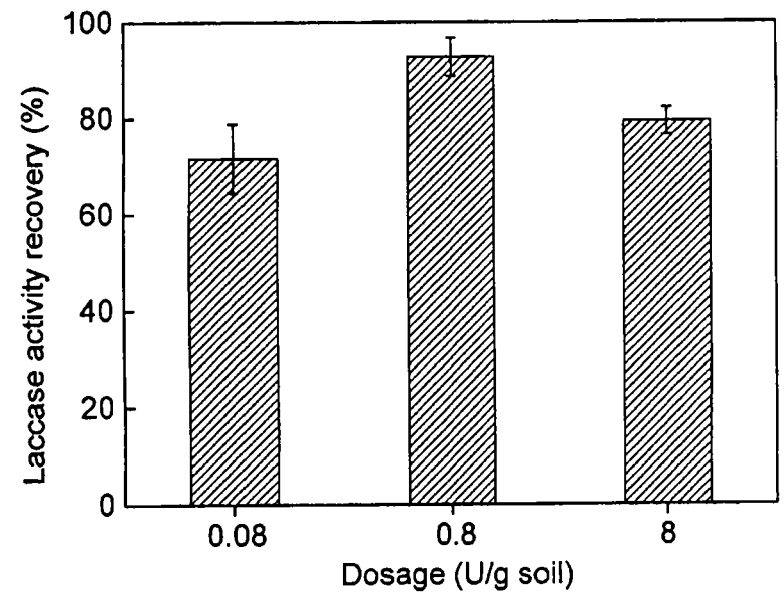
Figure 4A:
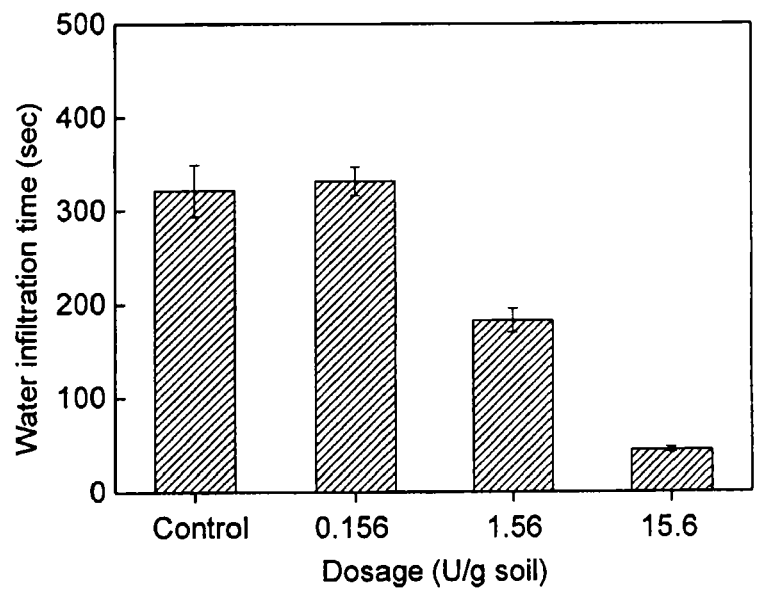
FIGS. 4A-4B are bar graphs illustrating WPDT of treated soil samples by pectinase at various dosages. Sample No. 7-FIG. 4A; sample No. 21-FIG. 4B.
Figure 4B:
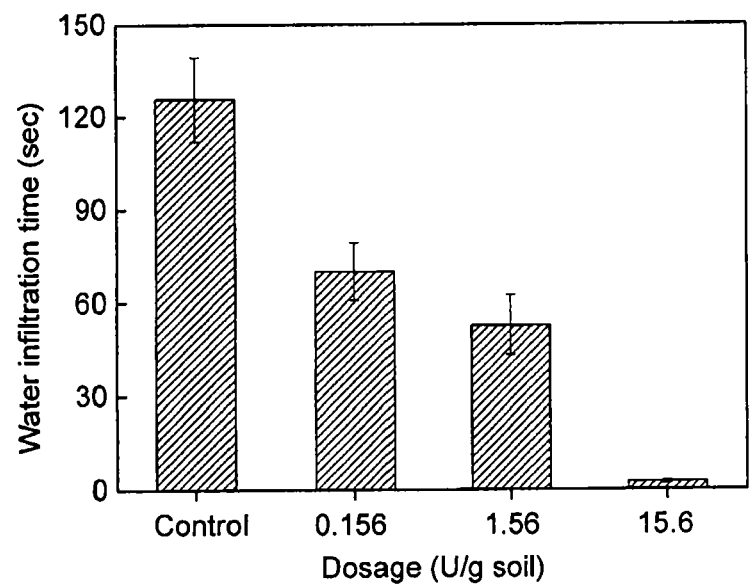
Figure 5A:
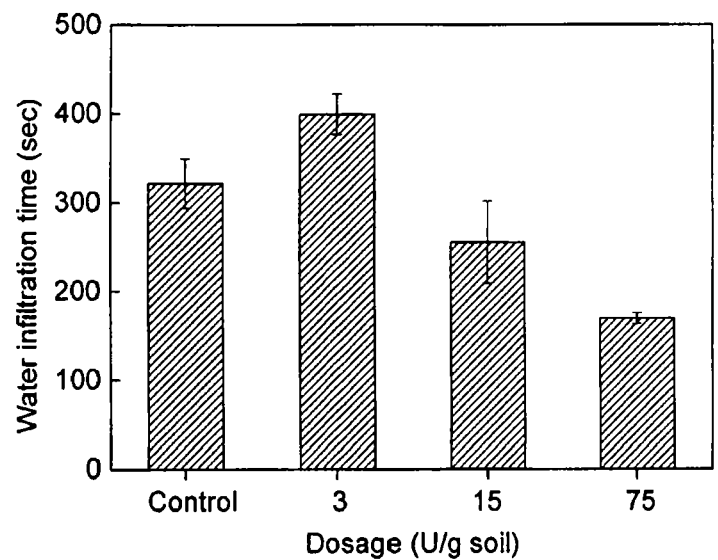
FIGS. 5A-5B are bar graphs illustrating WPDT of treated soil samples by cellulase at various dosages. Sample No. 7-FIG. 5A; sample No. 21-FIG. 5B.
Figure 5B:
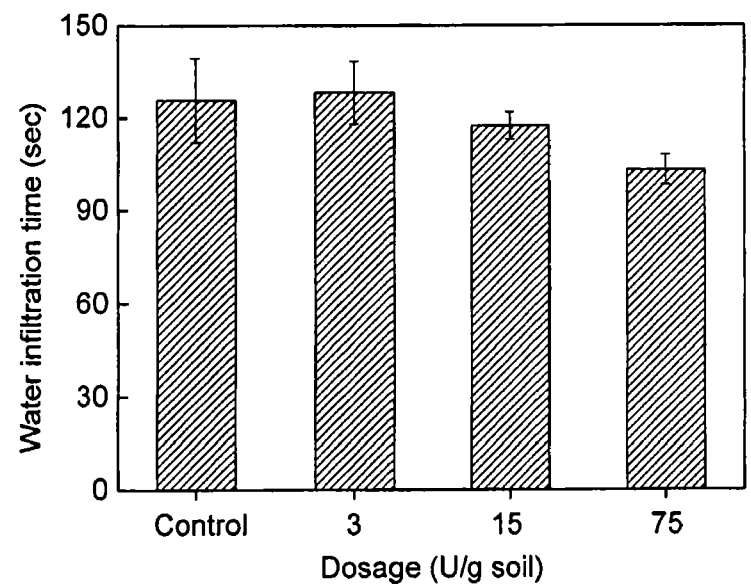
Figure 6A:
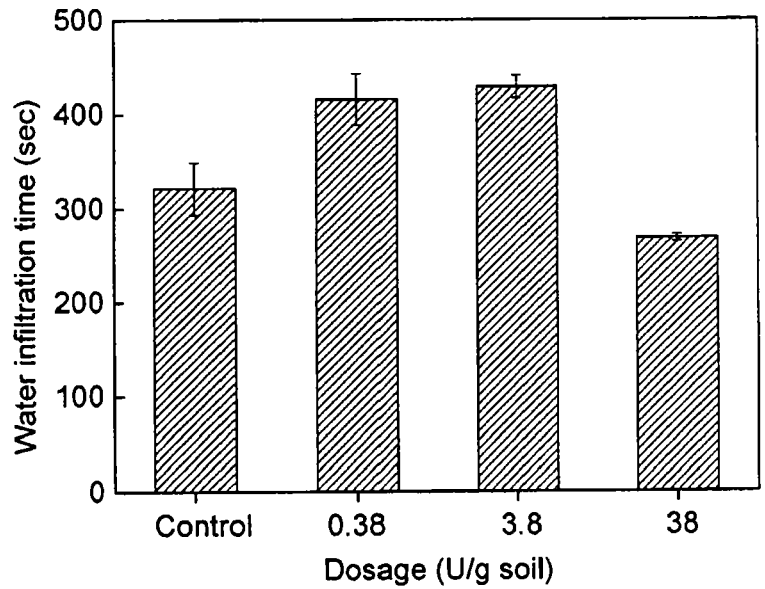
FIGS. 6A-6B are bar graphs illustrating WPDT of treated soil samples by xylanase at various dosages. Sample No. 7-FIG. 6A; sample No. 21-FIG. 6B.
Figure 6B:
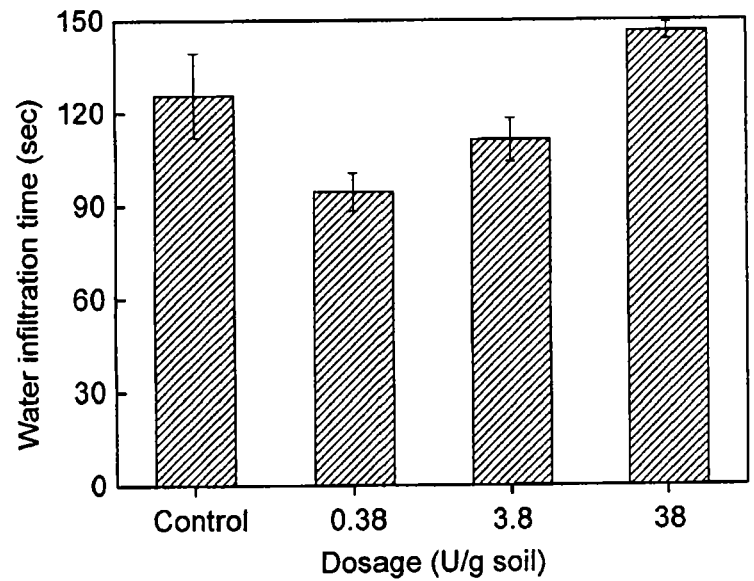
Figure 7A:
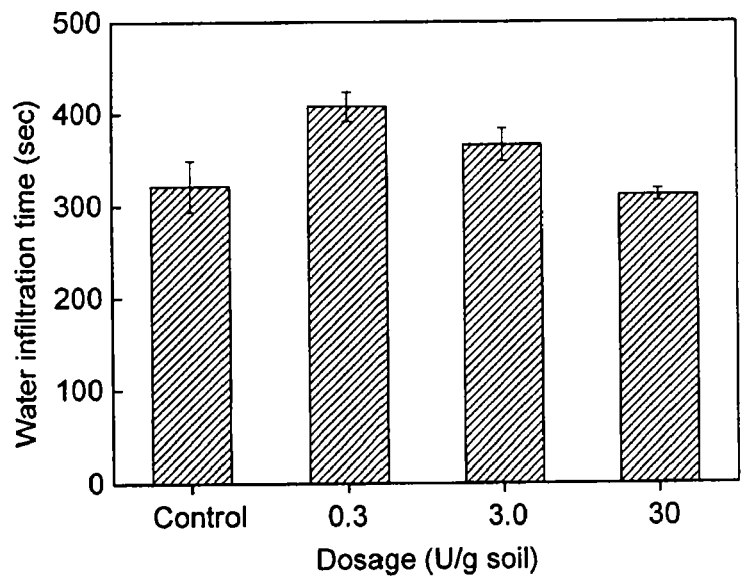
FIGS. 7A-7B are bar graphs illustrating WPDT of treated soil samples by β-glucosidase at various dosages. Sample No. 7-FIG. 7A; sample No. 21-FIG. 7B.
Figure 7B:
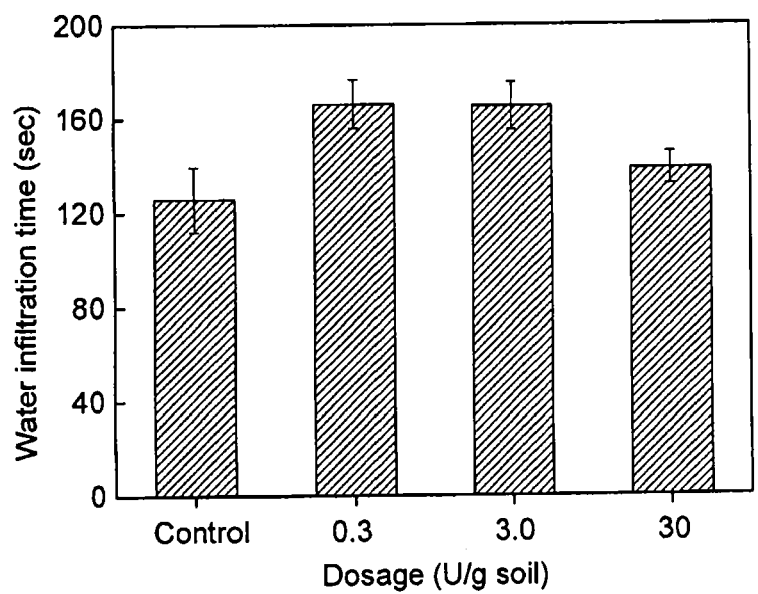
Figure 8A:
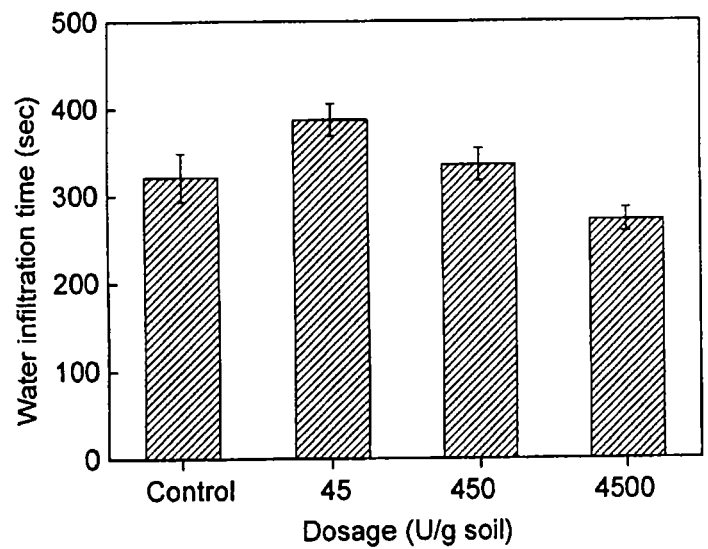
FIGS. 8A-8B are bar graphs illustrating WPDT of treated soil samples by α-amylase at various dosages. Sample No. 7-FIG. 8A; sample No. 21-FIG. 8B.
Figure 8B:
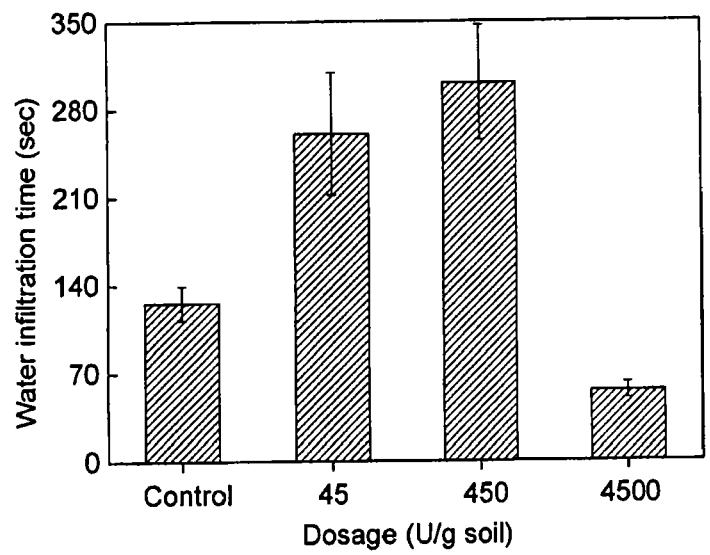
Figure 9A:
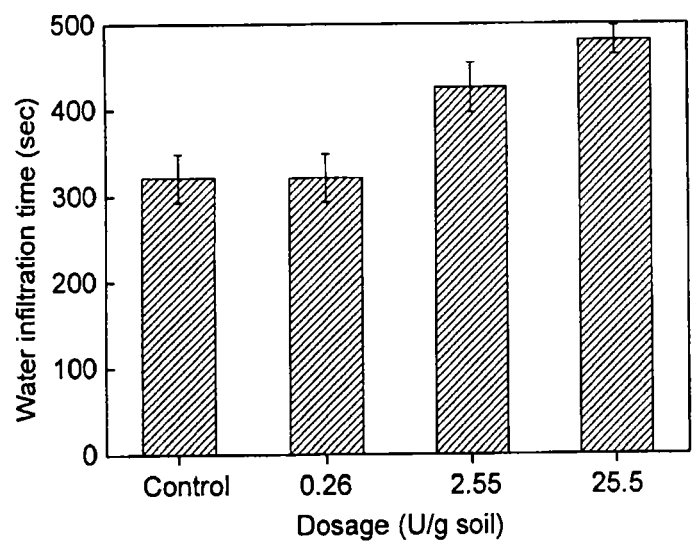
FIGS. 9A-9B are bar graphs illustrating WPDT of treated soil samples by esterase at various dosages. Sample No. 7-FIG. 9A; sample No. 21-FIG. 9B.
Figure 9B:
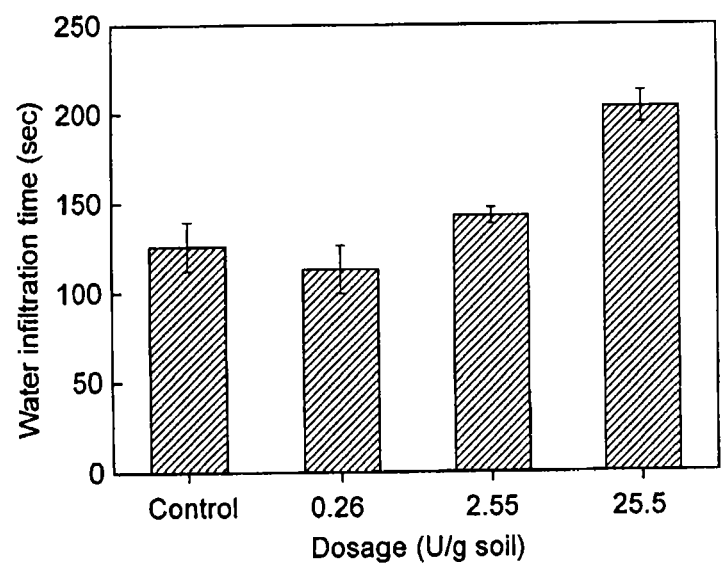
Figure 10A:
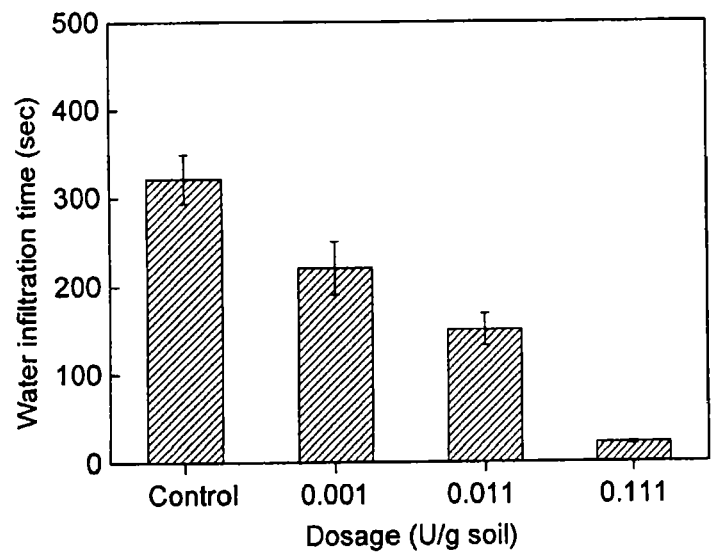
FIGS. 10A-10B are bar graphs illustrating WPDT of treated soil samples by chitinase at various dosages. Sample No. 7-FIG. 10A; sample No. 21-FIG. 10B.
Figure 10B:
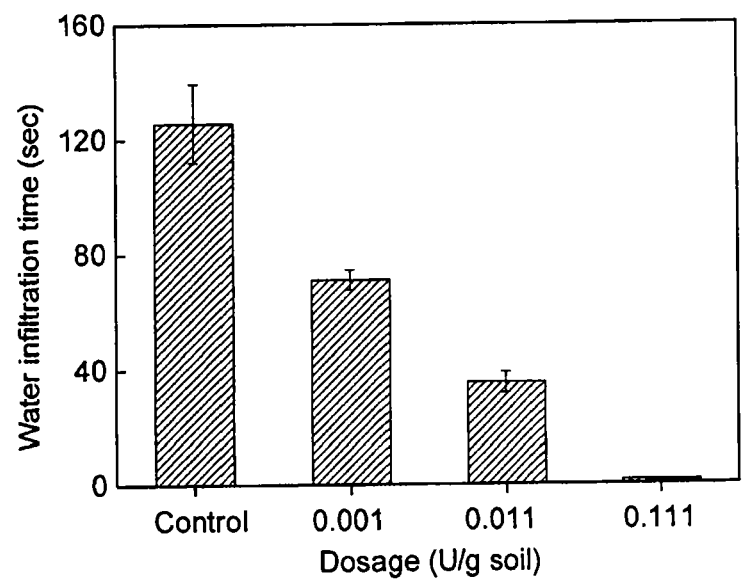
Figure 11A:
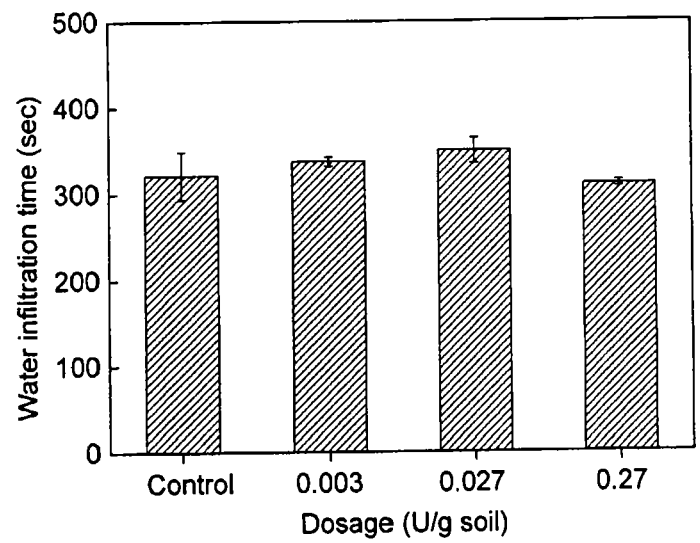
FIGS. 11A-11B are bar graphs illustrating WPDT of treated soil samples by lipase at various dosages. Sample No. 7-FIG. 11A; sample No. 21-FIG. 11B.
Figure 11B:
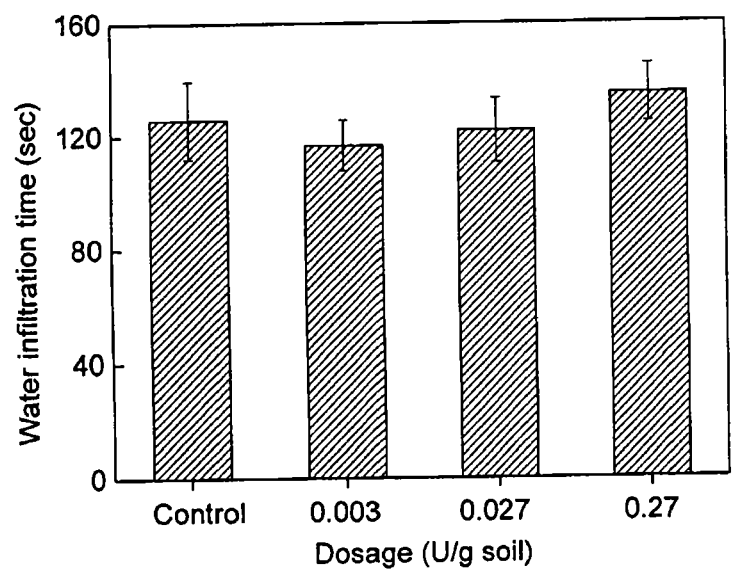
Figure 12A:
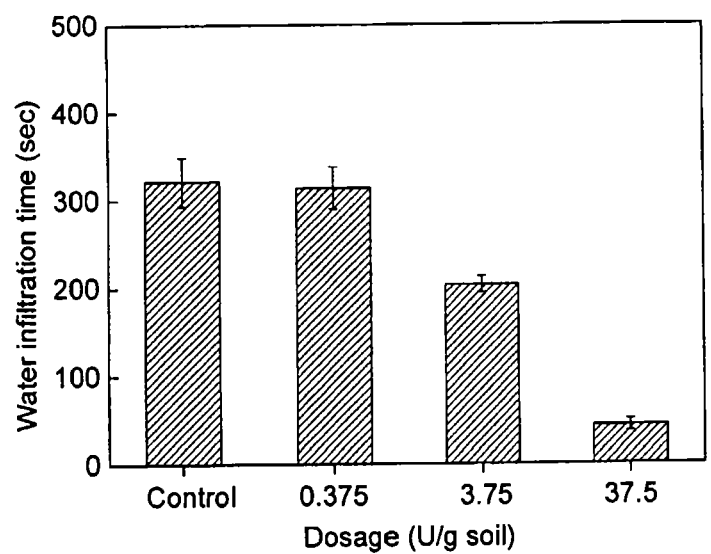
FIGS. 12A-12B are bar graphs illustrating WPDT of treated soil samples by protease at various dosages. Sample No. 7-FIG. 12A; sample No. 21-FIG. 12B.
Figure 12B:
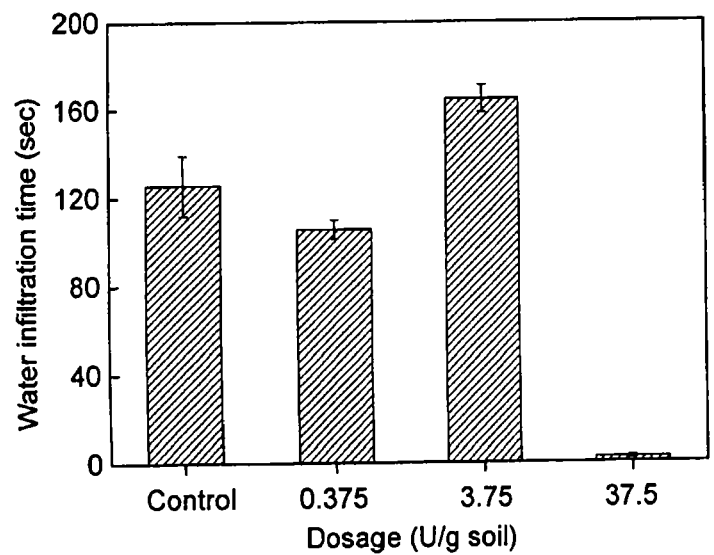

Detailed results of enzyme activity on reduction of SWR for each soil sample are shown in the graphs of FIGS. 2A-2B, and FIGS. 4A-12B. In summary, chitinase, laccase and pectinase substantially reduced SWR on both the normal LDS and the fairy ring soil samples as demonstrated by the dramatic reduction of WDPT at the highest activity of each enzyme. Protease also reduced SWR at higher enzyme dosage. Cellulase reduced SWR, but not to the extent of the above enzymes. Esterase, β-glucosidase, xylanase and α-amylase all increased SWR to some extent, although xylanase slightly decreasing SWR on the fairy ring soil, and α-amylase reduced SWR slightly on the normal soil. Laccase activity in the leachate solution following treatment was >40% and 75% in the normal and fairy ring LDS soils, respectively, as illustrated in FIGS. 3A-3B; thus exhibiting potential for continued soil activity.

Conclusions

Among the ten selected enzymes, the most effective in resolving SWR was chitinase, followed by laccase and pectinase at all experimental dosages on both soils. Protease was also effective in reducing water repellency at the high enzyme dosage (37.5 U/g soil). Cellulase appeared to exert a minor reduction of water repellency at higher enzyme dosages. No apparent effect was observed for lipase at various dosages in the present tests. In contrast, esterase treatment increased water infiltration time instead of reducing water repellency. This phenomenon was also found to a lesser degree for β-glucosidase, xylanase and α-amylase, although the highest α-amylase dosage exerted a positive effect on soil No. 21. It was interesting that a high laccase activity was found in the recovered liquid filtrate (leachate) in this study (other enzymes activity recovery rates have not been conducted yet).

Example 2

Alleviation of Soil Water Repellency Using a Crude Enzyme Extract from Fungal Pretreatment of Biomass The example describes embodiments of methods and compositions for remediation of SWR caused by high organic components. Organic components, such as, but not limited to, lignin increase water repellency of soil and other groundcover. Laccase plays an significant role in lignin degradation (Singh Arora and Kumar Sharma, 2010); and thus may be utilized to reduce SWR by direct action on the organic coating. Direct use of purified laccase would increase costs for field application. However, using crude laccase and other enzymes obtained as a co-product from other process may offer an economical approach for SWR remediation, especially with the complex of other enzymes present in culture extract.

This study evaluated the biological treatment of SWR using a crude enzymatic extract (CEE), which is a main co-product obtained during fungal pretreatment of switchgrass for fermentable sugar conversion in the process of biofuel production. This represents the first known use of direct enzyme treatment for alleviation of SWR, and the first to combine the use of a co-product obtained during switchgrass pretreatment to enhance cost-effectiveness of both bioremediation and biofuel production.

Materials and Methods

Soil Samples and Preparation:

It is documented that the most severe SWR often occurs at shallower soil depths (usually in the surface 2.5 to 5.0 cm), especially in sandy soils. Also SWR is seasonal and can be affected by rainfall/moisture content. In this study, soils were sampled from different turfgrass sites with a history of SWR, exhibiting visual symptoms on the grass, and with the presence of SWR suggested by field measurements of soil moisture by time-domain reflectometry probes. Samples were obtained from golf courses in Ga. and Fla. using a profile sampler in February 2012 to collect the upper layer (0-3.8 cm). The samples were then air dried at room temperature for several days until reaching constant moisture (Table 3). One sample from the sand-based research sport field at the Griffin campus of the University of Georgia was sampled at the 2.5 to 3.8 cm zone and was the only site that SWR was not visible at the time of sampling. Air dried soils were gently passed through a 2 mm sieve to remove grass tissues, then stored at room temperature for subsequent usage. Overall, eight different soils were employed in this study and their properties are summarized in Table 3, below.

Treatment of Soil Samples Using Crude Enzyme:

Ten grams of soil was put into a 50 ml porcelain crucible with subsequent addition of 10 mL enzyme solution or control (deionized water). The crucible was covered with parafilm after homogeneous agitation and incubated under static condition at room temperature for 3 days with periodic agitation. The treated soil samples were separated by filtration using a vacuum and oven dried at 40° C. for 36 h and then subjected to water repellency analysis. The filtrate from the above procedure was then analyzed for remaining enzyme activity determination. The activity of crude enzyme extract (without dilution) employed in this study was summarized in Table 4, below. Fungal pretreatment of switchgrass and laccase production profile were shown in a companion paper (Liu et al., 2012).

Soil Water Repellency Analysis:

The soil water repellency was analyzed using the water drop penetration time (WDPT) method described by Doerr (Doerr, 1998). Three separate water drops (0.05 mL for each) were gently uploaded onto the different surface of soil in each crucible. Penetration time was then recorded by a timer, with the end-point being when the water drop fully disappeared.

Effect of CEE Dilution and Treatment Time on Soil Water Repellency:

To investigate the effect of variable enzyme activity on soil water repellency, 54-d CEE was diluted to 5, 10 and 100 times and applied to treat 8 different soil samples under the same procedure as described above with WDPT of each was accordingly recorded.

For the effect of treatment time on soil water repellency, three different soils (No. 7, 17 and 21), which were sampled from different sites of golf courses, were selected as experimental targets. Due to lack of sufficient 54-d CEE for this section, 36-d CEE with dilution of 10 times was chosen to apply for soil treatment with WDPT of each was accordingly recorded. The filtrate after treatment by 36-d CEE was subsequently used for remaining enzymatic activity determination.

Enzymatic Activity Determination of the Filtrate after Treatment:

The substrates were purchased from Sigma for following enzyme activity determination (DMP: 2,6-Dimethylphenol; p-NPG: 4-Nitrophenyl β-D-glucuronide). Activity of laccase was determined based on the method described by Litthauer et at (2007) with some modification. In detail, 3 ml reaction mixture (2.4 ml citrate phosphate buffer/pH 3.5, 0.1 M; 0.1 ml enzyme solution; 0.5 ml DMP/10 mM) was performed at room temperature. The oxidation was monitored at 469 nm ($\epsilon$=49.5 mM$^{-1}$ cm$^{-1}$) and one unit of activity was defined as the amount of enzyme that oxidized 1 μmol of DMP per min.

Activity of β-glucosidase was determined based on the method described by Turner et al. (2002) with some modification. In detail, 3 ml reaction mixture (2.4 ml citrate phosphate buffer/pH 4.8, 0.1 M; 0.1 ml enzyme solution; 0.5 ml p-NPG/10 mM) was performed at 50° C. for 10 min and then was stopped by adding 1 ml $Na_2CO_3$/0.5 M. The absorbance was recorded at 405 nm ($\epsilon=18,300$ mM$^{-1}$ cm$^{-1}$), and one unit of activity is defined as the amount of enzyme that liberates 1 μmol of p-nitrophenol per min. The total remaining activity of enzymes (U) was calculated by multiplying unit activity (U/ml) and total volume of the filtrate (ml). All activity analyses were conducted in triplicates and relatively expressed as mean±standard deviation with the highest value as 100%.

Results and Discussion

Figure 13:
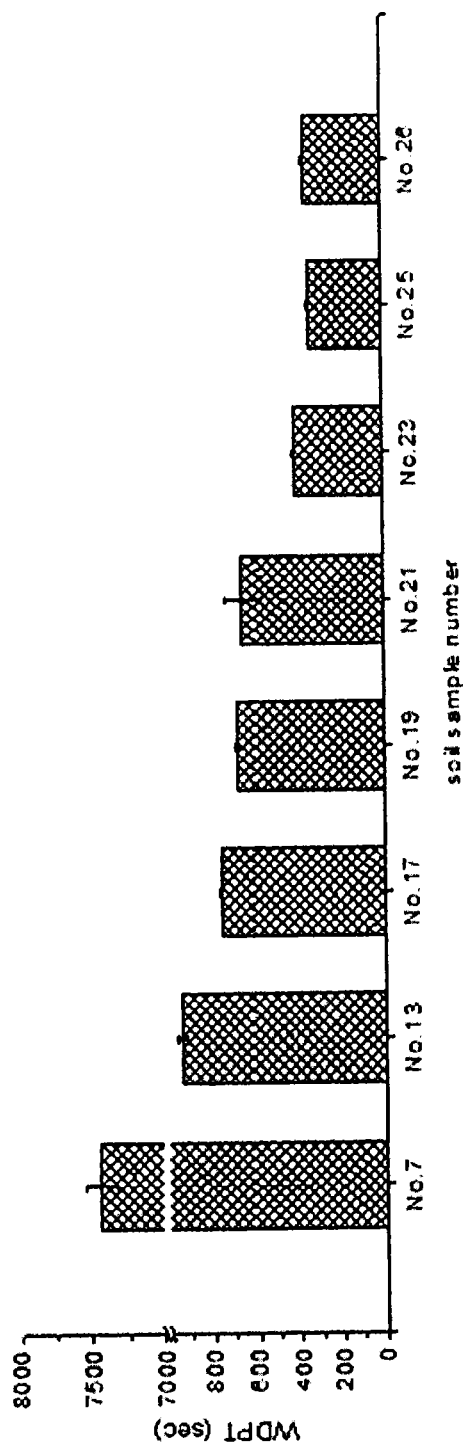
FIG. 13 is a bar graph illustrating soil water repellency of various untreated soil samples in Example 2.

Soil Water Repellency of Untreated Soil Samples:

Water repellency of untreated soil samples was analyzed using water drop penetration time (WDPT), and the results are shown in FIG. 13. All selected samples exhibited water repellency to varying degrees, with No. 7 from sandy area (Rough 10, Fla.) as the most repellent and No. 25 from clay loam (Fairway 3, Ga.) as the least repellent. The water infiltration time was 7435, 951, 779, 680, 655, 417, 343 and 364 sec for soil No. 7, 13, 17, 19, 21, 23, 25 and 26, respectively. The WDPT involves placement of a droplet of water on an air-dried soil sample surface with the WDPT classes being: <5 s for a non-hydrophobic or hydrophilic soil, 5-60 s slightly water repellent, 60-600 s strongly water repellent, 600-3600 s severely water repellent, and >5 hr as extremely water repellent (Dekker and Ritsema, 1994). According to this standard, 8 samples in this study can be classified into three categories: No. 7 (extremely hydrophobic soils); No. 13, 17, 19 and 21 (severely hydrophobic soils); and No. 23, 25 and 26 (strongly hydrophobic soils). The sand, No. 26, from Griffin campus of UGA, was also identified as a water repellent sample; although no apparent drought stress (LDS) was observed on the grass at the time of sampling, the site had exhibited SWR in the past.

Patterns of SWR differ among different field situations, with LDS sandy turfgrass soils and grasslands having a reoccurring problem exhibited as irregular moderate to severe dry areas. The second common form of SWR situation on turfgrass sites is within the dry, circular area of basidiomycete induced "fairy-ring," which can be on all soil types (Fidanza et al., 2007). Water repellency induced by "fairy-ring" was observed on both the samples obtained from "fairy-ring" areas of the sandy turfgrass soil (No. 21) as well as on the clay loam soils (No. 25), but was less severe on the clay loam. In practical agriculture and turf management, SWR can increase runoff and reduce irrigation efficiency, water storage in rootzone, and infiltration, and thus significantly impact crop production and turf quality. To date, precise mechanisms behind water repellency are still not fully understood (Müller and Deurer, 2011).

Figure 14:
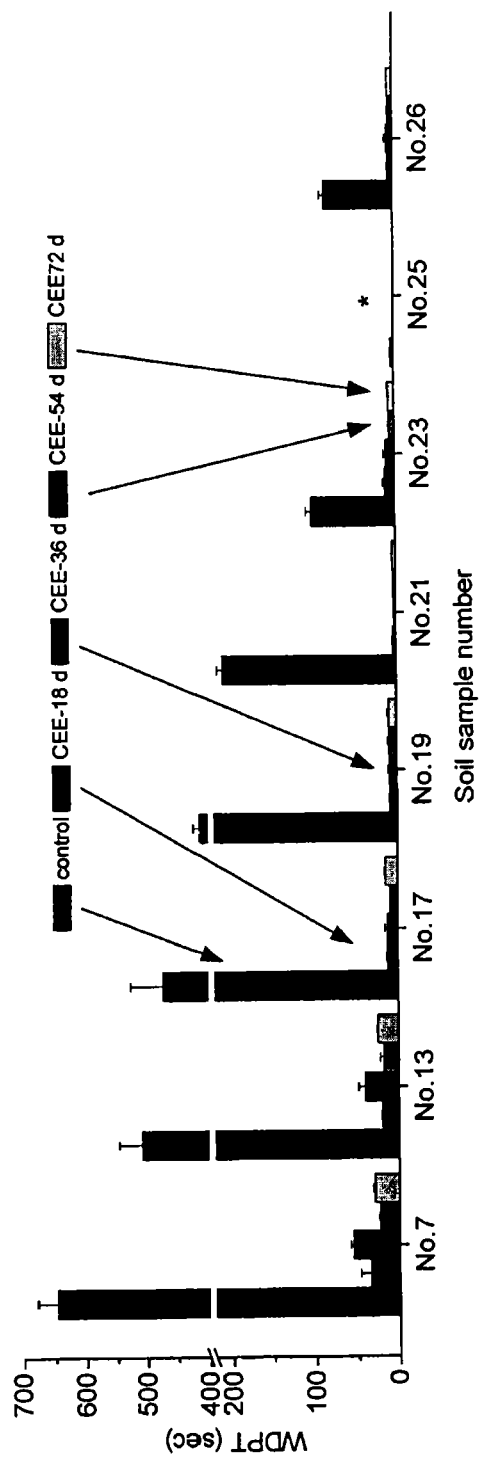
FIG. 14 is a bar graph illustrating the effect various crude enzyme extracts (CEE) on soil water repellency of various soil samples. In each group and the legend, the far left=control; second from left=CEE 18 d; middle=CEE 36 d; second from right=CEE 54 d; and far right=CEE 72 d.

Effect of the Crude Enzyme Extract on Soil Water Repellency:

During fungal pretreatment of switchgrass for various cultivation times in a companion study (Liu et al., 2012), four different crude enzyme extracts were obtained, corresponding to 18-d, 36-d, 54-d, and 72-d cultivation, respectively, with fermentation periods and their activities listed in Table 4. Effectiveness of direct utilization of these enzyme extracts to reduce water repellency on the eight soils is shown in FIG. 14. Excellent results were found for all four extracts in terms of reducing WDPT compared to that of untreated samples (FIG. 13) and control samples with water (far left bar in FIG. 14). For the untreated soil samples (hydrophobic), water drops were not readily absorbed by soil particles (FIG. 13). After enzymatic treatment, water drops took a very short time to penetrate surface of all soils with WDPT all <50 sec except treatment of soil No. 7 with 36-d extract.

It was interesting that water treatment (control) also showed positive effect on reducing water repellency, with WDPT for most soils reduced approximately 50% of that untreated (90% for soil No. 7) as illustrated comparing FIG. 13 and FIG. 14 data. In field situations, one of the means to minimize SWR severity is more frequent irrigation; however, this increases water-use, may interfere with site use, and is often of limited effectiveness (Moore et al., 2010). Various degrees of effectiveness in alleviating water repellency has been reported from application of surfactants and addition of clay to sand soils to increase particle surface area, since normal LDS is seldom observed in fine-textured soils, while SWR in "fairy-ring" areas can occur on all soil types (Müller and Deurer, 2011). Treatment of the clay loam soil (No. 25) with high soil moisture (water treatment) or enzyme solution were both effective in alleviation of SWR. Effectiveness of several wetting agents was also conducted in this study (data not shown) and results were highly similar to that of enzymatic treatment. However, in field situations, it is not unusual for wetting agents to be of limited effectiveness, such as reported for use on hydrophobic sand with high organic matter content (Barton and Colmer, 2011); or demonstrated limited duration of effectiveness (Moore et al., 2010). Therefore, using direct enzyme approach appears to have the potential to be better or equivalent to wetting agents, which would offer an alternative means of remediation of SWR that is directed toward altering the organic coatings.

Figure 15:
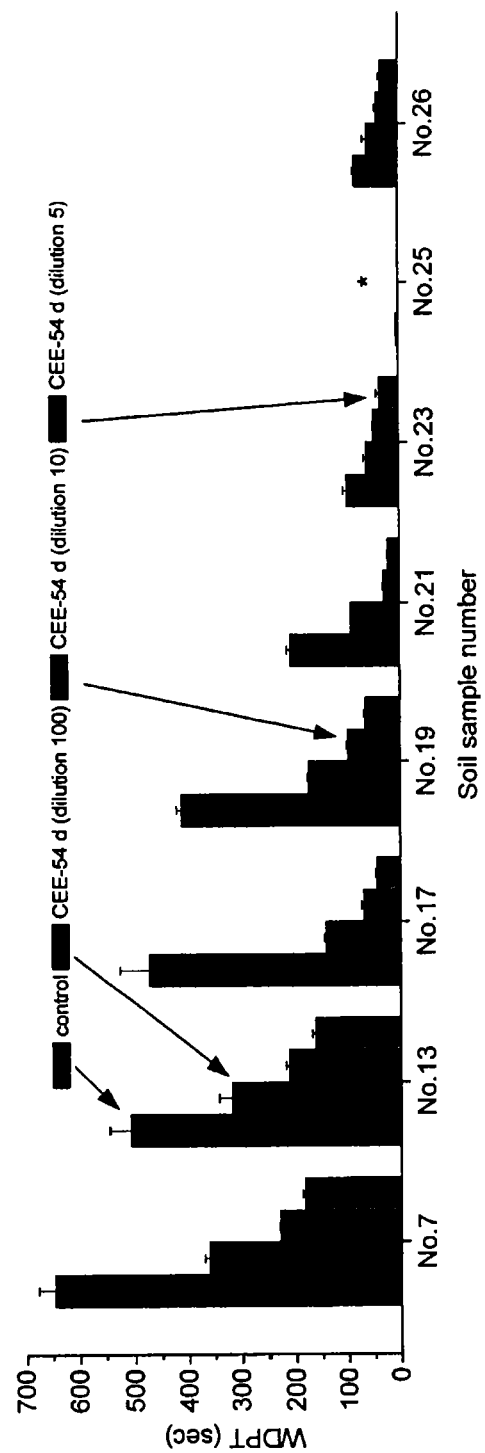
FIG. 15 is a bar graph illustrating the effect of the 54-d crude enzyme extract (CEE) (at varying dilutions) on soil water repellency of various soil samples. In each group and the legend, the far left=control; second from left=CEE 54 d (100× dilution); second from right=CEE 54 d (10× dilution); and far right=CEE 54 d (5× dilution).

Effect of the Crude Enzyme Dilution on Soil Water Repellency:

To study the relationship between SWR and ligninolytic activity of CEEs, 8 soil samples were treated by the 54-d CEE at various dilutions of 5, 10 and 100, respectively (FIG. 15). This CEE extract has the highest laccase, MnP, and LiP ligninolytic enzyme activities among the four CEEs (Table 4). As ligninolytic activity increased, SWR decreased, indicating a positive correlation between soil wettability and enzyme activity. All 54-d CEE treatments significantly reduced SWR relative to the control, except for soil No. 25 where the water control was also effective in eliminating SWR. Water infiltration time of 8 soil samples treated with 54-d CEE dilution-5 (i.e., diluted 5 times) reduced to around ⅓ of that obtained for the control. Enzymatic treatment of all soils with 54-d CEE dilution-10 times was nearly as effective as the treatment with 54-d CEE dilution-5. When applied with 54-d CEE dilution-100, WDPT was approximately half of that for the control for all soils except No. 25 (clay). This data suggests that in practical applications, original enzyme extract can be directly applied, or alternatively a diluted formulation with increasing frequency may be effective.

Figure 16:
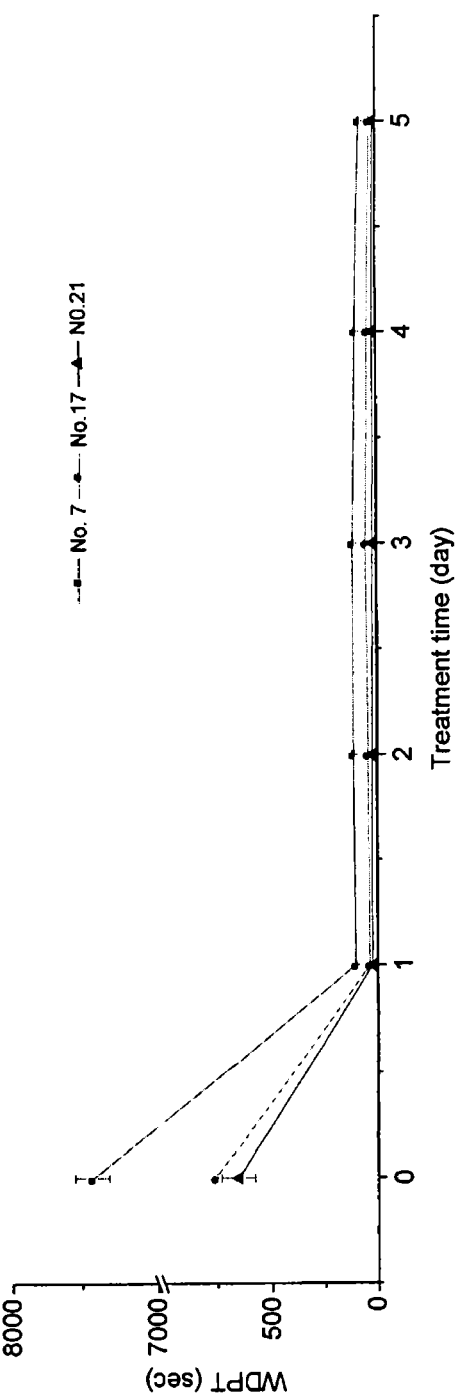
FIG. 16 is a line graph showing the effect of treatment time on soil water repellency of various soil samples by the 36-d crude enzyme extract (CEE) (dilution 10). Line with square marker is testing on soil No. 7; line with circle marker is on soil sample No. 17; and line with triangle marker is for soil No. 21.

Effect of Treatment Time on Soil Water Repellency:

To better understand the enzymatic reaction process during the treatment, efficiency of SWR alleviation was investigated at various treatment times with results shown in FIG. 16. A marked decrease in WDPT was observed for three selected soils (No. 7, No. 17 and No. 21) in only 24 h treatment using 36-d CEE dilution-10 (Table 4, FIG. 16). WPDT rapidly dropped to 110, 40 and 25 sec after 1-d treatment from 7440, 760 and 655 sec of untreated No. 7, No. 17 and No. 21, respectively. No apparent decrease in WDPT was seen for more prolonged treatment times (2-5 days). The results suggest that enhanced effectiveness might be achieved by applying enzyme at low activity at a high frequency coupled with irrigation.

Figure 17:
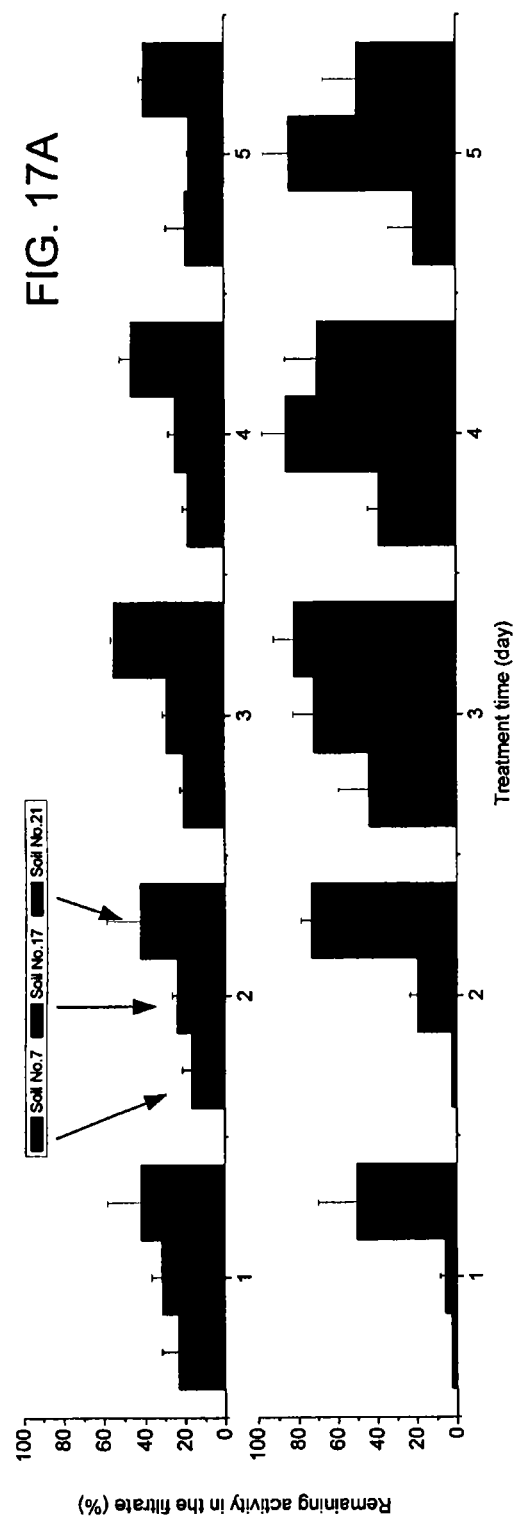
FIGS. 17A-17B are bar graphs of remaining enzyme activity (FIGS. 17A: laccase and 17B: β-glucosidase) of the filtrate after treatment of various soil samples. In each group and the legend, the far left=soil No. 7; middle=soil No. 17; and far right=soil No. 21.

Remaining Enzyme Activity of the Filtrate after Treatment:

For practical field application of enzymes, enzyme stability is one of the most important parameters to investigate. Enzymes with high stability will facilitate and broaden their application scopes and may also reduce the total cost by reducing application rates. In this study, laccase and β-glucosidase are the two main enzymatic activities detected in the CEEs for the ligninolytic and hydrolytic activities, respectively. To provide insight into potential activity in field situations, their residual activities within the filtrate after treatment for alleviation of SWR were examined. As shown in FIG. 17, relatively high activities of laccase and β-glucosidase were detected in the filtrate from the previous experiment reported in FIG. 16. From FIG. 17A, remaining laccase activity in the filtrate was almost the same during various soil treatment times, indicating its stability in soil. However, different soils affected the residual activity, with 20% (No. 7), 25% (No. 17), and 40% (No. 21) residual laccase activity on average over time, respectively. Greatest activity loss was found in the first day of treatment, which was likely due to adsorption of enzyme onto the surface of soil particles that would contribute to improved wettability of treated soils. The similar trend was observed for β-glucosidase activity for 1-5 day treatment times with relatively high activity remaining even after 5-d (FIG. 17B). Some increase in the residual β-glucosidase activity was obtained for extended treatment times. The highest relative β-glucosidase activity (over 80%) appeared in the filtrate for 4-d treatment. Soil No. 21 showed higher residual β-glucosidase activity than observed in the other soils. This phenomenon might be ascribed to the soil type of No. 21 (fairy-ring), which is often caused by fungi. These fungi might secrete some chemicals to soils with ability to help stabilize enzymes activity that would differ from the organic matter within normal SWR areas.

Direct remediation of SWR soils requires attention to the hydrophobic organic matter coatings and the particulate matter that are associated with normal SWR (e.g., LDS) situations on sandy soils or on soil particles in "fairy-ring" SWR areas that can occur on any soil type (Müller and Deurer, 2011). Both SWR situations are significant problems on recreational turfgrass areas (Barton and Colmer, 2011; Fidanza et al., 2007). Based on the results obtained in the present studies, applying enzyme technology to SWR, potential mechanisms include:

a) Soaking these soils in water might alter the condition of self-organization of organic matters and thus reduce water repellency to some extent.
b) Application of enzymes may degrade/decompose some of organic matter coating associated with SWR or alter the hydrophobic-hydrophilic characteristics of the organic matter to reduce SWR as noted by Horne and McIntosh (2000) when they studied extraction approaches.
c) There may also be biosurfactants in the enzyme extract secreted by the fungi contributing to SWR alleviation. Production of biosurfactants has been demonstrated in some wax-degrading bacteria with potential ability of reducing SWR (Roper, 2004).

A novel application of the enzymatic co-product from switchgrass pretreatment in a biofuel project was demonstrated in the present example, with success in alleviation of SWR in all soils evaluated at laboratory scale. For practical application, such as in turfgrass SWR situations, cost and enzyme effectiveness are both important. Field testing with comparison to wetting agents will further refine enzymatic co-product use and assess cost-effectiveness for this environment friendly approach. The mechanism for the reaction during the treatment may also be clarified. Utilization of original enzyme extract or appropriate dilution can be directly applied to treat water SWR soils with results within 1-d in laboratory conditions. High relative enzyme activity remained over the 5-d study period.

Conclusions

The crude enzyme extract, a co-product of fungal pretreatment of switchgrass for bioethanol production, was successfully employed to reduce SWR. This is believed to be the first report of direct enzyme application to soils to remediate SWR. After enzymatic treatment, all selected hydrophobic soils showed excellent effect in terms of reduced water infiltration time. In the present example, a one day treatment period was effective. A positive relationship between enzyme activity level and influence on WDPT was also demonstrated. High activity of laccase and β-glucosidase were detected in filtrate after treatment, indicating their potential stability for field applications.

References: The following references are hereby incorporated by reference herein Arias, M. E., Arenas, M., Rodriguez, J., Soliveri, J., Ball, A. S., Hernandez, M., 2003. Kraft pulp biobleaching and mediated oxidation of a nonphenolic substrate by laccase from *Streptomyces cyaneus* CECT 3335. Appl. Environ. Microbiol. 69, 1953-1958.

Atanassova, I. D. S., 2010. Organic compounds of different extractability in total solvent extracts from soils of contrasting water repellency. Eur. J. Soil. Sci. 61, 298-313.

Barton, L., Colmer, T. D., 2011. Ameliorating water repellency under turfgrass of contrasting soil organic matter content: Effect of wetting agent formulation and application frequency. Agr. Water. Manage. 99, 1-7.

Blanco-Canqui, H., 2011. Does no-till farming induce water repellency to soils? Soil. Use. Manage. 27, 2-9.

Dekker, L. W., Oostindie, K., Ritsema, C. J., 2005. Exponential increase of publications related to soil water repellency. Soil Res. 43, 403-441.

Dekker, L. W., Ritsema, C. J., 1994. How water moves in a water repellent sandy soil. 1. Potential and actual water repellency. Water Resour. Res. 30, 2507-2517.

Doerr, S. H., 1998. On standardizing the 'Water Drop Penetration Time' and the 'Molarity of an Ethanol Droplet' techniques to classify soil hydrophobicity: A case study using medium textured soils. Earth Surf. Proc. Land. 23, 663-668.

Doerr, S. H., Shakesby, R. A., Walsh, R. P. D., 2000. Soil water repellency: its causes, characteristics and hydrogeomorphological significance. Earth-Sci. Rev. 51, 33-65.

Fidanza, M. A., Cisar, J. L., Kostka, S. J., Gregos, J. S., Schlossberg, M. J., Franklin, M., 2007. Preliminary investigation of soil chemical and physical properties associated with type-I fairy ring symptoms in turfgrass. Hydrol. Process. 21, 2285-2290.

Horne, D. J., McIntosh, J. C., 2000. Hydrophobic compounds in sands in New Zealand—extraction, characterisation and proposed mechanisms for repellency expression. J. Hydrol. 231-232, 35-46.

Kumar, P., Barrett, D. M., Delwiche, M. J., Stroeve, P., 2009. Methods for pretreatment of lignocellulosic biomass for efficient hydrolysis and biofuel production. Ind. Eng. Chem. Res. 48, 3713-3729.

Litthauer, D., van Vuuren, M. J., van Tonder, A., Wolfaardt, F. W., 2007. Purification and kinetics of a thermostable laccase from *Pycnoporus sanguineus* (SCC 108). Enzyme. Microb. Technol. 40, 563-568.

Liu, J., Wang, M., Tonnis, B., Habteselassie, M., Liao, X., Huang, Q., 2012. Fungal pretreatment of switchgrass for improved saccharification and simultaneous enzyme production. Bioresource Technol. submitted,
Lu, J., Huang, Q., Mao, L., 2009. Removal of acetaminophen using enzyme-mediated oxidative coupling processes: I. Reaction rates and pathways. Environ. Sci. Technol. 43, 7062-7067.
Müller, K., Deurer, M., 2011. Review of the remediation strategies for soil water repellency. Agr. Ecosyst. Environ. 144, 208-221.
Moore, D., Kostka, S. J., Boerth, T. J., Franklin, M., Ritsema, C. J., Dekker, L. W., Oostindie, K., Stoof, C., Wesseling, J., 2010. The effect of soil surfactants on soil hydrological behavior, the plant growth environment, irrigation efficiency and water conservation. J. Hydrol. Hydromech. 58, 142-148.
Pinto, P. A., Dias, A. A., Fraga, I., Marques, G., Rodrigues, M. A. M., Colaço, J., Sampaio, A., Bezerra, R. M. F., 2012. Influence of ligninolytic enzymes on straw saccharification during fungal pretreatment. Bioresource Technol. 111, 261-267.
Rodríguez Couto, S., Sanromán, M., Gübitz, G. M., 2005. Influence of redox mediators and metal ions on synthetic acid dye decolourization by crude laccase from *Trametes hirsuta*. Chemosphere. 58, 417-422.
Rodríguez Couto, S., Toca Herrera, J. L., 2006. Industrial and biotechnological applications of laccases: A review. Biotechnol. Adv. 24, 500-513.
Roper, M., 2006. Potential for remediation of water repellent soils by inoculation with wax-degrading bacteria in southwestern Australia. Biologia. 61, S358-S362.
Roper, M. M., 2005. Managing soils to enhance the potential for bioremediation of water repellency. Soil Res. 43, 803-810.
Roper, M. M., 2004. The isolation and characterisation of bacteria with the potential to degrade waxes that cause water repellency in sandy soils. Aust. J. Soil Res. 42, 427-434.
Singh Arora, D., Kumar Sharma, R., 2010. Ligninolytic fungal laccases and their biotechnological applications. Appl. Biochem. Biotechnol. 160, 1760-1788.
Strong, P. J., Burgess, J. E., 2007. Bioremediation of a wine distillery wastewater using white rot fungi and the subsequent production of laccase. Water Sci. Technol. 56, 179-186.
Taniguchi, M., Takahashi, D., Watanabe, D., Sakai, K., Hoshino, K., Kouya, T., Tanaka, T., 2010. Evaluation of fungal pretreatments for enzymatic saccharification of rice straw. J. Chem. Eng. Jpn. 43, 401-405.
Turner, B. L., Hopkins, D. W., Haygarth, P. M., Ostle, N., 2002. β-glucosidase activity in pasture soils. Appl. Soil. Ecol. 20, 157-162.
Zeng, Y. L., Yang, X. W., Yu, H. B., Zhang, X. Y., Ma, F. Y., 2011. Comparative studies on thermochemical characterization of corn stover pretreated by White-Rot and Brown-Rot Fungi. J. Agric. Food Chem. 59, 9965-9971.

TABLE 3

Characteristics of the various soil samples used in this study.

| ID number | Description | Depth (cm) | Location | Comments |
|---|---|---|---|---|
| 7 | Rough 10, site D | 0-3.8 | Old Collier GC, Naples, FL | Sand area, normal LDS |

TABLE 3-continued

Characteristics of the various soil samples used in this study.

| ID number | Description | Depth (cm) | Location | Comments |
|---|---|---|---|---|
| 13 | Fairway 11 | 0-3.8 | Old Collier GC, Naples, FL | Sand area, normal LDS |
| 17 | Practice green | 0-3.8 | Houston Lakes CC, Perry, GA | Sand area, normal LDS |
| 19 | Green 10 | 0-3.8 | Houston Lakes CC, Perry, GA | Sand area, normal LDS |
| 21 | Practice green | 0-3.8 | Southern Hills Golf and CC, Hawkinsville, GA | Sand, fairy ring area, LDS |
| 23 | Green 8 | 0-3.8 | Southern Hills Golf and CC, Hawkinsville, GA | Sand area, normal LDS |
| 25 | Fairway 3 | 0-3.8 | Idle Hour GC, Macon, GA | Clay loam, fairy ring area LDS |
| 26 | Sand area, sports field | 2.5-3.8 | Sand area of sports field, Griffin, GA | Sand area, no apparent LDS |

TABLE 4

Enzyme activity of the crude enzyme extract (CEE) used in this study. Ligninolytic enzymes were: lignin peroxidase (LiP), manganese peroxidase (MnP), and laccase. Hydrolytic enzyme was: β-glucosidase. Cultivation time refers to the days of fungal pretreatment of switchgrass for fermentable sugars conversion with the enzyme co-product extracted at that time.

| Cultivation | Ligninolytic activity (U/ml) | | | Hydrolytic activity (U/ml) |
|---|---|---|---|---|
| time/d | laccase | MnP | LiP | β-glucosidase |
| 18 | 0.24 ± 0.01 | 0.03 | 0.01 | 0.03 |
| 36 | 0.33 ± 0.01 | 0.05 | 0.04 ± 0.01 | 0.03 |
| 54 | 0.46 ± 0.02 | 0.11 ± 0.01 | 0.08 ± 0.01 | 0.08 |
| 72 | 0.41 ± 0.02 | 0.07 | 0.07 | 0.11 ± 0.01 |

Example 3

Comparison of Enzymes and Wetting Agents for SWR

Introduction

At present, wetting agents are part of an important approach to alleviate soil water repellency in turfgrass, and represent a substantial expense involved in treating such problems. The above examples have demonstrated that some enzymes can also have positive effects on solving problems with SWR. However, there are different mechanisms in practice in the two approaches. To compare the difference between enzymes and wetting agents, four selected enzymes and two wetting agents were used in example.

Material and Methods

Except where otherwise stated, materials and methods for this Example are the same as described in Example 1 above.

Soil Samples:

Soil No. 7 and soil No. 21, described in Example 1 above, were used in these tests.

Enzymes and Wetting Agents:

Enzymes: Chitinase 0.111 U/g soil, Laccase 8.0 U/g soil, Pectinase 1.56 U/g soil, Protease 37.5 U/g soil.

Wetting agents: Aquatrols Aquaduct® and Lesco-Wet™. 2‰ (v/v), which is 2 to 3× the normal wetting agent application rate.

Treatment and Analysis:

10 g air-dried soils were placed in different crucibles. For control samples, the soil was combined with 15 ml deionized water. For the test crucibles, 15 ml different enzyme liquid or 1 ml 2‰ wetting agents+14 ml water, were added to the soil sample respectively. The samples were stirred and covered with film paper, and incubated at room temperature for 24 h. After incubation the samples were filtrated by using a vacuum pump and oven dried at 40° C. for 12 h. The samples were cooled to room temperature and used for subsequent water repellency analysis. After that, each 15 ml deionized water was added to each crucible and soaked for 6 h. The samples were then filtrated and oven dried again for the next water repellency analysis from the $21^{st}$ to the $29^{th}$ of the month (9 days). The samples were filtration again and incubated at room temperature for 5 days, then oven dried and WDPT analyzed from the $29^{th}$ of the month to the 24 of the following month (27 days).

Results

Figure 18:
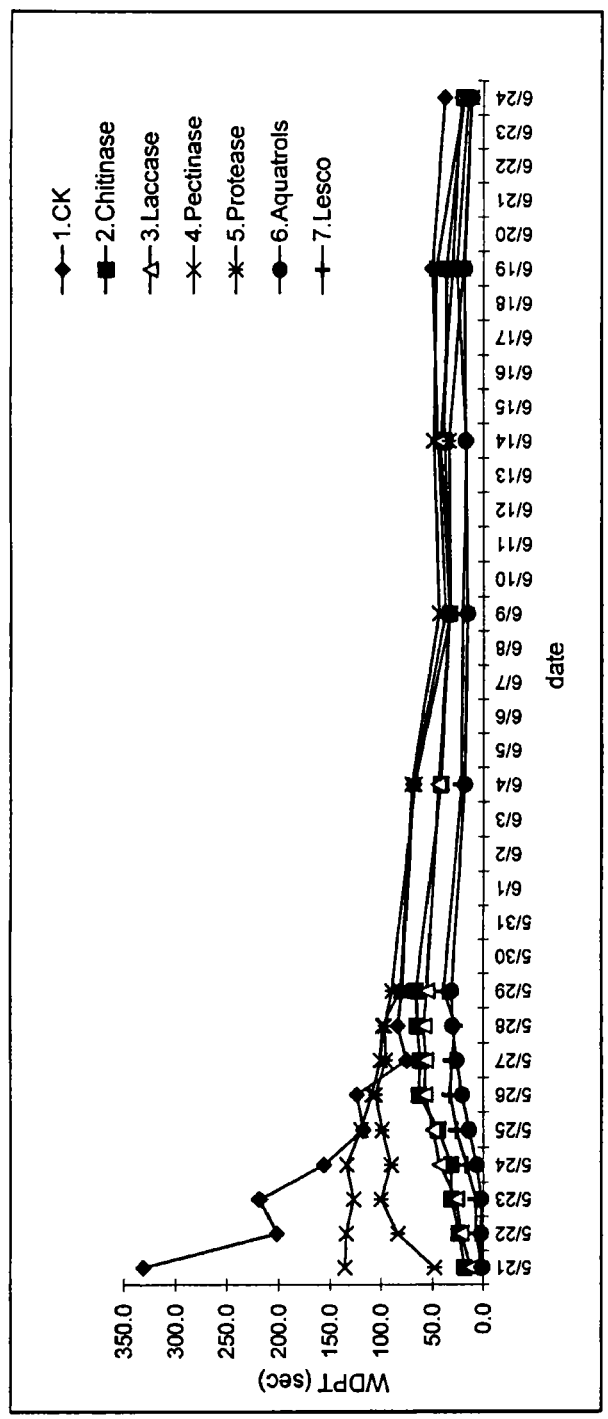
FIG. 18 is a graph illustrating the WDPT of samples treated by various enzymes and wetting agents on soil sample No. 7.

FIG. 18 illustrates that in soil No. 7, on the first treated day, the control sample (water treated) was the highest value with an average of around 340 sec., then decreased sharply at the first seven days of treatment, after that, the decrease gradually slowed through the end of June. The sample treated by pectinase had the second-highest average values, from the first treated day to the end on June 9 with a trend of gradual decreasing, with a small variation. The samples treated by protease posited the third place; however, these samples demonstrated an increase during the first treatment days, reaching the highest value on May 27, then decreasing slowly to the end of June. The samples treated by chitinase and laccase with the near values and similar trend, at first increased, followed by a decrease. The highest value for each appeared on different days, with laccase on May 27 and Chitinase on May 29. In our experiment period, the two water agents had the lowest values and a similar trend, ascending at first, then descending slowly. Aquatrols demonstrated a slightly better effect than the Lesco.

Figure 19:
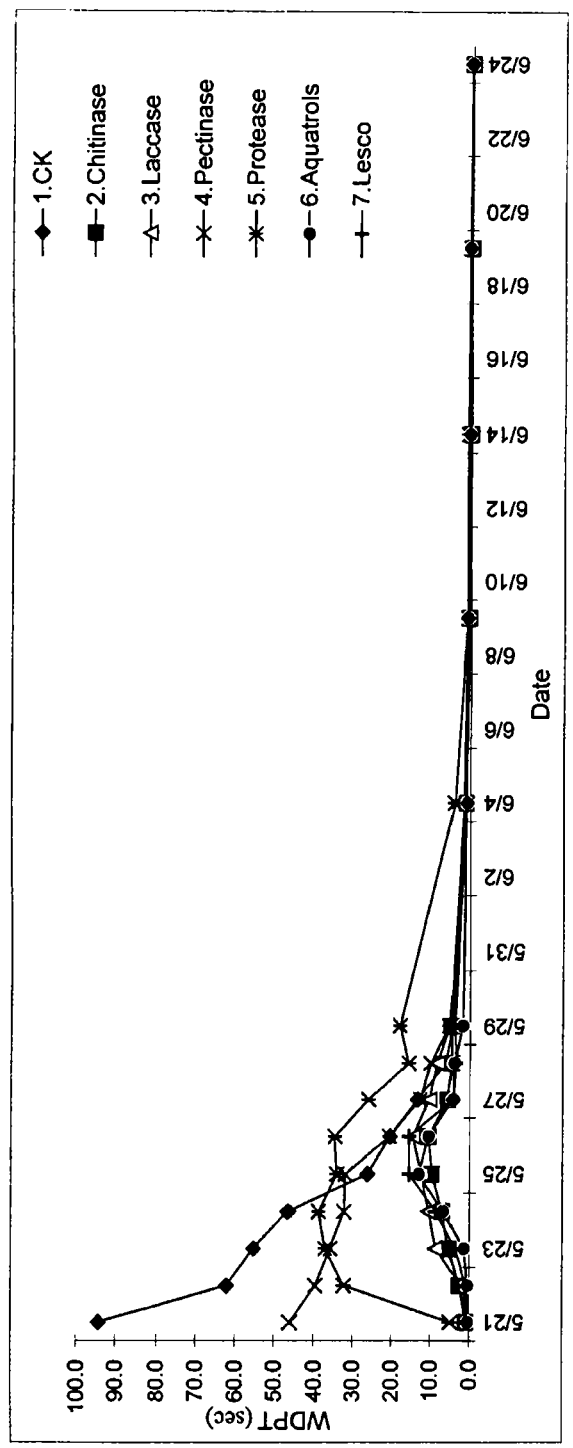
FIG. 19 is a graph illustrating the WDPT of samples treated by various enzymes and wetting agents on soil sample No. 21.

FIG. 19 also illustrates that all the treatments in soil No. 21 displayed a similar trend to the samples for soil No. 7. However, the WDPT values were smaller in soil No. 21 than in soil No. 7, and from June 5 to June 24 all values were very small and stable.

Conclusions

The experiment demonstrated that soils No. 7 and soil No. 21 demonstrated similar trends with the various treatments. The WDPT values of control had the highest values and sharply decreased in the first seven days then decreasing slowly to the end of June. Pectinase treatment demonstrated the second values with a decrease in the first treated nine days, followed by a little variation. The treatments of the other enzymes and water agents had a similar trend, with the WDPT values increasing first, then decreasing. In the experiment period, the two water agents still appeared to demonstrate a better effect on WDPT than the enzyme treatment, with Aquatrols somewhat superior to Lesco. However, the reduced cost of the enzyme treatments may represent an incentive to use such an approach instead of or in addition to treatment with wetting agents.

It should be noted that ratios, concentrations, amounts, dimensions, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include not only the explicitly recited range of about 0.1% to about 5%, but also include individual ranges (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the numerical value and measurement technique. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

References For Example 3: The following examples are incorporated herein by reference.

Atanassova, I. and S. Doerr. 2010. Organic compounds of different extractability in total solvent extracts from soils of contrasting water repellency. Europ. J. of Soil Sci. 61: 298-313.

Bailey, T. G., N. J. Davidson, and D. C. Close. 2012. Understanding the regeneration niche: microsite attributes and recruitment of eucalypts in dry forests. Forest Ecol. And Management 269: 229-238.

Barton, L. and T. D. Colmer. 2011. Ameliorating water repellency under turfgrass of contrasting soil organic matter content: effect of wetting agent formulation and application frequency. Agric. Water Management 99: 1-7.

Dekker, L. W., K. Oostindie, and C. J. Ritsema. 2005. Exponential increase of publications related to soil water repellency. Aust. J. of Soil Res. 43: 403-441.

Deurer, M., K. Muller, C. Van Den Dijssel, K. Mason, J. Carter and B. E. Clothier. 2011. Is soil water repellency a function of soil order and proneness to drought? A survey of soils under pasture in the North Island of New Zealand. European J. of Soil Science 62: 765-779.

Doerr, S. H. 1998. On standardizing the 'water drop penetration time' and the 'molarity of an ethanol droplet' techniques to classify soil hydrophobicity: a case study using medium textured soils. Earth Surf. Process. Landforms 23: 663-668.

Doerr, S. H., R. A. Shakesby, and R. P. D. Walsh. 2000. Soil water repellency: its causes, characteristics and hyrogoemorphological significance. Earth-Sci. Reviews 51: 33-65.

Doerr, S. H. and 13 coauthors. 2005. Extraction of compounds with water repellency in sandy soils of different origin. Aust. J. of Soil Res. 43: 225-237.

Doerr, S. H., C. J. Ritsema, L W. Dekker, D. F. Scott, and D. Carter. 2007. Preface—water repellency of soils: new insights and emerging research needs. Hydrological Processes 21: 2223-2228.

Fidanza, M. A., J. L. Cisar, S. J. Kostka, J. S. Gregos, M. J. Schlossberg, and M. Franklin. 2007. Preliminary investigation of soil chemical and physical properties associated with type-I fairy ring symptoms in turfgrass. Hydrological Processes 21: 2285-2290.

Franco, C. M. M., M. E. Tate, and J. M. Oades. 1995. Studies on non-wetting sands. I. The role of intrinsic particulate organic matter in the development of water-repellency in non-wetting sands. Aust. J. Soil Res. 33: 253-263.

Gartam, R. and N. Ashwath. 2012. Hydrophobicity of 43 potting media: Its implications for raising seedlings in revegetation programs. J. of Hydrol. 430-431: 111-117.

Horne, D. J. and J. C. McIntosh. 2000. Hydrophobic compounds in sands in New Zealand—extraction, characterization and proposed mechanisms for repellency expression. J. of Hydrology 231-232: 35-46.

Huang, Q., S. S. Sidhu, P. L. Raymer, and R. N. Carrow. 2012. Methods and compositions using fungal laccases to reduce turf thatch. Patent No. 20120079764.

Karnok, K. A., E. J. Rowland, and K. H. Tan. 1993. High pH treatments and the alleviation of soil hydrophobicity on golf greens. Agron. J. 85: 983-986.

Letey, J. 1969. Measurement of contact angle, water drop penetration time, and critical surface tension. Proc. of the Symposium on Water-Repellent Soils, 6-10 May 1968. Univ. of California, Riverside, 43-47.

Madsen, M. D. and S. L. Petersen. 2010. Seed coating compositions and methods for applying soil surfactants to water-repellent soil. US Patent No. 2010/0267554 A1.

Madsen, M., S. Kostka, A. Inouye, and D. Zvirzdin. 2012. Post-fire restoration of soil hydrology and wildland vegetation using surfactant seed coating technology. Geophysical Res. Abstracts, Vol. 14, EGU2012-3209.

Moody, D. R., M. J. Schlossberg, D. D. Archbald, A. S. McNitt, and M. A. Fidanza. 2009. Soil water repellency development in amended sand rootzones. Crop Sci. 49: 1885-1892.

Moore, D., S. J. Kostka, T. J. Boerth, M. Franklin, C. J. Ritsema, L. W. Dekker, K. Oostindie, C. Stoof, and J. Wesseling. 2010. The effect of soil surfactants on soil hydrological behavior, the plant growth environment, irrigation efficiency and water conservation. J. Hydrol. Hydromech. 58(3): 142-148.

Muller, K. and M. Deurer. 2011. Review of the remediation strategies for soil water repellency. Agric., Ecosystems and Environ. 144: 208-221.

Nadav, I., J. Tarchitzky, A. Lowengart-Aycicegi, and Y. Chen. 2011. Soil surface water repellency induced by treated wastewater irrigation: physio-chemical characterization and quantification. Irrig. Sci. DOI 10.1007/s00271-011-0291-3.

Pierson, F. B., P. R. Robichaud, C. A. Moffet, K. E. Spaeth, C. J. Williams, S. P. Hardegree, and P. E. Clark. 2008. Soil water repellency and infiltration in coarse-textured soils of burned and unburned sagebrush ecosystems. Catena 74: 98-108.

Rillig, M. C. 2005. A connection between fungal hydrophobins and soil water repellency? Pedobiologia 49: 395-399.

Roper, M. M. 2004. The isolation and characterization of bacteria with the potential to degrade waxes that cause water repellency in sandy soils. Aust. J. of Soil Res. 42: 427-434.

Roper, M. M. 2005. Managing soils to enhance the potential for bioremediation of water repellency. Aust. J. of Soil Res. 43: 803-810.

Roper, M. M. 2006. Potential for remediation of water repellent soils by inoculation with wax-degrading bacteria in south-western Australia. Biologia, Bratislava 61/Suppl. 19:S358-S362. Section Botany.

Sidhu, S. S., Q. Huang, R. N. Carrow, and P. L. Raymer. 2012a. Use of fungal laccases to facilitate biodethatching: a new approach. HortTech (submitted, in review).

Sidhu, S. S., Q. Huang, R. N. Carrow, and P. L. Raymer. 2012b. Laccase mediated changes in physical, chemical, and structural properties of creeping bentgrass (*Agrostis stolonifera* L.) thatch layer. J. of Environmental Quality (submitted).

Wallis, M. G., Horne, D. J., 1992. Soil water repellency. Advances in Soil Science 20, 91-140.

Watson, C. L. and J. Letey. 1970. Indices for characterizing soil water-repellency based upon contact angle-surface tension relationships. Proc. of the Soil Sci. Soc. of Amer. 34: 841-844.

We claim:

1. A method of reducing soil water repellency (SWR) comprising:
applying to an area of groundcover selected from turfgrass soils, farmlands, and agricultural grasslands, the groundcover having SWR associated with localized dry spot (LDS), basidiomycete induced fairy ring, or both and having a water droplet penetration time (WDPT) greater than 60 seconds, an effective amount of a composition comprising least one isolated enzyme capable of degrading or altering organic matter associated with SWR, wherein the isolated enzyme composition is effective to reduce the SWR of the area of groundcover, measured as WDPT, by a measureable amount after treatment with the enzyme composition, and wherein the enzyme is selected from the group of enzymes consisting of: laccase, pectinase, chitinase, cellulase, and a combination of two or more of these enzymes.

2. The method of claim 1, wherein the enzyme is applied in a liquid.

3. The method of claim 2, wherein the enzyme is mixed with irrigation water.

4. The method of claim 1, wherein the enzyme is applied in a topdressing applied to the groundcover, wherein the topdressing is particulate and the enzyme is coupled to the particles.

5. The method of claim 1, wherein the enzyme is applied as a powdered seed coating.

6. The method of claim 1, further comprising applying a wetting agent to the area of groundcover.

7. The method of claim 1, further comprising:
obtaining a crude enzymatic extract (CEE) from fungal pretreatment of biomass in a biofuel production process, wherein the CEE comprises one or more enzymes selected from the group of enzymes consisting of: laccase, pectinase, chitinase, and cellulase, and
using this CEE, without further purification, as the isolated enzyme composition.

8. The method of claim 7, wherein the CEE comprises isolated laccase and isolated β-glucosidase.

9. The method of claim 1, wherein the enzyme is applied in conjunction with fungicide treatments to alleviate plant diseases associated with SWR areas.

10. The method of claim 1, wherein the composition comprises at least two enzymes capable of degrading or altering organic matter associated with SWR.

11. The method of claim 1, wherein at least one enzyme in the composition comprises pectinase or chitinase.

12. A method of preventing soil water repellency (SWR) comprising: applying to an area of groundcover selected from turfgrass soils, farmlands, and agricultural grasslands, the groundcover having a history of SWR associated with localized dry spot (LDS) basidiomycete induced fairy ring, or both and having a water droplet penetration time (WDPT) of about 60 seconds or less, an effective amount of a composition comprising at least one isolated enzyme capable of degrading or altering organic matter associated with SWR, wherein the enzyme is selected from the group of enzymes consisting of: laccase, pectinase, chitinase, cellulase, and a combination of two or more of these enzymes, wherein the SWR, measured as WDPT, of the treated area of groundcover increases less than the SWR of an area of groundcover that was not treated with the isolated enzyme composition.

13. The method of claim 1, wherein the enzyme is laccase and wherein the composition is applied in an enzyme dosage of about 0.08 to 8 U/g of soil.

14. The method of claim 13, wherein the SWR of the area of groundcover, measured as water droplet penetration time (WDPT), is reduced by about 8 to 99% compared to an untreated area of groundcover.

15. The method of claim 1, wherein the enzyme is chitinase and wherein the composition is applied in an enzyme dosage of about 0.0011 to .11 U/g of soil.

16. The method of claim 15, wherein the SWR of the area of groundcover, measured as water droplet penetration time (WDPT), is reduced by about 35 to 99.7% compared to an untreated area of groundcover.

17. The method of claim 1, wherein the enzyme is pectinase and wherein the composition is applied in an enzyme dosage of about 0.156 to 15.6 U/g of soil.

18. The method of claim 17, wherein the SWR of the area of groundcover, measured as water droplet penetration time (WDPT), is reduced by about 1 to 99.4% compared to an untreated area of groundcover.

19. The method of claim 1, wherein the groundcover is turfgrass having sandy soil.

* * * * *